United States Patent
Masuda

(10) Patent No.: US 7,068,295 B2
(45) Date of Patent: Jun. 27, 2006

(54) OPTICAL WRITING UNIT, A DRIVING METHOD THEREOF, AND AN IMAGE FORMING APPARATUS

(75) Inventor: Koji Masuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/607,005

(22) Filed: Jun. 27, 2003

(65) Prior Publication Data

US 2004/0008247 A1    Jan. 15, 2004

(30) Foreign Application Priority Data

Jul. 15, 2002   (JP)   .............................. 2002-206312

(51) Int. Cl.
    *B41J 2/45*   (2006.01)
(52) U.S. Cl. ..................................... 347/238
(58) Field of Classification Search ........ 347/130–132, 347/236–238, 240, 246–247, 251, 253, 254, 347/135, 128; 358/296; 257/98; 250/200, 250/227.28; 372/29.014
    See application file for complete search history.

(56) References Cited

U.S. PATENT DOCUMENTS

| | | | | |
|---|---|---|---|---|
| 4,956,684 A | * | 9/1990 | Urata | 257/98 |
| 5,767,979 A | * | 6/1998 | Kim | 358/296 |
| 5,838,024 A | | 11/1998 | Masuda et al. | 257/98 |
| 5,875,051 A | | 2/1999 | Suzuki et al. | 359/205 |
| 5,962,874 A | | 10/1999 | Masuda et al. | 257/98 |
| 5,986,791 A | | 11/1999 | Suzuki et al. | 359/207 |
| 6,069,724 A | | 5/2000 | Hayashi et al. | 359/206 |
| 6,075,638 A | | 6/2000 | Masuda | 359/206 |
| 6,081,386 A | | 6/2000 | Hayashi et al. | 359/641 |
| 6,141,133 A | | 10/2000 | Suzuki et al. | 359/207 |
| 6,172,700 B1 | * | 1/2001 | Obata | 347/237 |
| 6,188,086 B1 | | 2/2001 | Masuda et al. | 257/98 |
| 6,222,662 B1 | | 4/2001 | Suzuki et al. | 359/205 |
| 6,259,546 B1 | | 7/2001 | Masuda | 359/205 |
| 6,266,077 B1 | * | 7/2001 | Kamimura | 347/236 |
| 6,384,949 B1 | | 5/2002 | Suzuki | 359/196 |
| 6,456,314 B1 | | 9/2002 | Masuda | 347/244 |
| 6,462,879 B1 | | 10/2002 | Masuda | 359/626 |
| 6,496,214 B1 | | 12/2002 | Masuda et al. | 347/244 |
| 2002/0101642 A1 | | 8/2002 | Masuda | 359/196 |

FOREIGN PATENT DOCUMENTS

| | | | |
|---|---|---|---|
| JP | 8-118722 | | 5/1996 |
| JP | 08118722 A | * | 5/1996 |
| JP | 2001080111 A | * | 3/2001 |

(Continued)

OTHER PUBLICATIONS

U.S. Appl. No. 10/058,446, filed Jan. 28, 2002, Masuda.

(Continued)

*Primary Examiner*—Hai Pham
(74) *Attorney, Agent, or Firm*—Oblon, Spivak, McClelland, Maier & Neustadt, P.C.

(57) ABSTRACT

An optical writing unit is capable of producing a high-quality image in which the formation of white stripes and black stripes, due to uneven intervals between light emitting devices, is suppressed. The unevenness, often occurring at the junction part of two-light emitting diode array chips, is compensated for by increasing or decreasing the light volume of light emitting devices that are located on and near the edge of a light emitting device array chip, such that a property value concerning an exposure intensity distribution falls within a predetermined range for an effective image domain in its entirety.

12 Claims, 25 Drawing Sheets

FOREIGN PATENT DOCUMENTS

JP        2001138568 A  *  5/2001

OTHER PUBLICATIONS

U.S. Appl. No. 09/984,236, filed Oct. 29, 2001, Masuda et al.
U.S. Appl. No. 09/987,553, filed Nov. 15, 2001, Masuda.
U.S. Appl. No. 10/153,588, filed May 24, 2002, Masuda et al.
U.S. Appl. No. 10/607,005, filed Jun. 27, 2003, Masuda.
U.S. Appl. No. 10/981,723, filed Nov. 5, 2004, Masuda.

* cited by examiner

Where Pa<P

2P>P+Pa

EVERY THIRD LIGHT EMITTING DEVICES SELECTED

WHERE 3P<2P+Pa

ADJACENT LIGHT EMITTING DEVICES

ADJACENT LIGHT EMITTING DEVICES

WHERE Pa<PL

OPTICAL WRITING UNIT, A DRIVING METHOD THEREOF, AND AN IMAGE FORMING APPARATUS

BACKGROUND OF THE INVENTION

1. Field of the Invention

The present invention generally relates to an optical writing unit, a driving method thereof, and an image forming apparatus that are applicable to digital output equipment, such as a digital copier, a printer, and a digital FAX. The present invention specifically relates to the optical writing unit, the driving method thereof, and the image forming apparatus consisting of a light emitting device array consisting of a plurality of light emitting device array chips, each chip consisting of a plurality of light emitting devices that are arranged at a predetermined interval, and an image forming device array.

2. Description of the Related Art

In recent years and continuing, miniaturization of the optical writing unit for performing digital writing is required as the miniaturization of digital image output equipment, such as a digital copier, a printer, and a digital facsimile, progresses.

Methods of digital writing can be broadly divided into two kinds at present.

One of the methods is an optical scanning method wherein optical scanning is carried out by a light flux irradiated from a luminous source, such as semiconductor laser, which is deflected by an optical deflector, and an optical spot is formed through a scanning image-forming lens. The other method is a solid-state optical writing method wherein an optical spot is formed by a light flux irradiated from a light emitting device array, such as a light emitting diode (LED) array and an organic EL (electroluminescent) array, the light flux being put through an image forming device array.

The optical scanning method, using the optical deflector for scanning, tends to have a long optical path. On the other hand, the solid-state optical writing method requires a short optical path, and therefore, can be compactly structured. Further, the solid-state optical writing method does not use movable parts like an optical deflector; therefore, there is an advantage that noise can be suppressed (low noise). The optical writing unit using the solid-state optical writing method consists of a light emitting device array that consists of a plurality of light emitting devices, and an image forming device array that consists of a plurality of image forming devices. Here, a conventional example of the optical writing unit using a rod lens array is described with reference to FIG. 40.

The optical writing unit shown in FIG. 40 includes a light emitting device array chip 324, consisting of a plurality of light emitting devices arranged at a predetermined interval on a substrate 323; the substrate 323 is contained in a container indicated by 321 and 325; and an image forming device array 322, consisting of a rod lens array for forming an optical spot by light irradiated from each light emitting device, the optical spot being irradiated on a photo conductor 326 that is an image supporting object for image formation. As the light emitting device array, a light emitting diode array, wherein light emitting diodes are arranged at a predetermined interval, for example, is widely used. The light emitting diode array includes dozens to hundreds of light emitting diode-array chips mounted on the substrate, each of the diode-array chips including dozens to hundreds of light emitting diodes arranged at the predetermined interval. Here, the light emitting diode-array chips are mounted on the substrate such that the interval of the light emitting diodes on the edges of adjacent light emitting diode-array chips desirably coincides with the predetermined interval.

FIG. 35 through FIG. 37 show an outline structure of the light emitting diode array. FIG. 35 is a plan drawing. FIG. 36 is a cross-sectional drawing. FIG. 37 is a plan drawing of the light emitting diode-array chip 324. As shown in FIG. 35 through FIG. 37, a plurality of light emitting diode-array chips 324 are mounted on the substrate 323. As shown in FIG. 37, a plurality of light emitting diodes 328 are mounted in each of the light emitting diode-array chips 324. Adjacent to each of the light emitting diode-array chips 324, driver ICs 329 and 330 are mounted on the substrate 323. The light emitting diode 328 of each light emitting diode-array chip 324 is driven by the driver ICs 329 and 330. Further, a connector 327 for connecting signal lines for sending luminescence data is formed. Further, as for the image forming device array 322 as shown by FIG. 40, a rod lens array consisting of a plurality of refractive-index distribution type rod lenses, which are bundled, are used. As shown in FIG. 38, the rod lens array is structured by bundling two sequences of the rod lenses 322a and 322b such that cross-sectional centers of the rod lenses form the apexes of equilateral triangles. Side plates 331a and 331b maintain the circumference of the rod lens array. Gaps between the rod lenses 322 are filled with an opaque material 334, which is solidified.

Other examples of the image forming device array are a roof prism lens array (RPLA), as shown in FIG. 39, and the like. In the RPLA, an incidence side lens face 335a, an ejecting side lens face 335b, a rib 336, and a roof prism 337 are formed in one body, as shown in FIG. 39. Further, an optical attenuator 339 of an opaque component for interrupting ghost light may additionally be provided between a set of lenses 338a and 338b, and a set of lenses 338a' and 338b', as shown in FIG. 41.

Now, the interval between any two adjacent light emitting diodes is desired to be uniform in the entire light emitting diode array. The uniformity in the interval is usually obtained within a light emitting diode array chip. However, it is difficult to maintain the uniformity in the interval between a light emitting diode on the edge of a light emitting diode-array chip 324 (chip) and another light emitting diode on the adjacent edge of the adjacent chip. This is because of the difficulty in maintaining uniformity in the distance (gap) between the light emitting diode-array chips 324 for manufacturing reasons.

Specifically, it is difficult to accurately control the distance (gap) between the light emitting diode-array chips (the chips) when mounting the chips on the substrate. If the light emitting diodes that are adjacent across the gap between the chips are apart too much, a crevice in an image is generated on the surface of the image bearing object 326 (drum, photo conductor), resulting in a white stripe on a printed image. If, conversely, the light emitting diodes that are adjacent across the gap between the chips are positioned too close to each other, optical spots generated by the light emitting diodes overlap, resulting in a black stripe on a printed image. For this reason, a conventional problem is that the chips have to be re-mounted on the substrate.

Then, a circuit for compensating for the crevice and the overlap has been considered, wherein an additional transistor is provided to the light emitting diode on the edge of the light emitting diode-array chip for adjusting the driving current of the light emitting diode on the edge of the light emitting diode-array chip, and an additional circuit is provided for compensating for the illuminating period. However, these solutions make the driving circuit complicated. It is far more desirable that the light emitting diodes be uniformly placed at a predetermined interval in the entire effective image domain. The interval of the light emitting diodes is explained with reference to FIG. 1 that is also used in explaining the embodiments of the present invention. As shown in FIG. 1, a plurality of light emitting diode-array chips 2 are mounted on a substrate 1, and a plurality of light emitting diodes 3 are mounted on each of the light emitting diode-array chips 2. It is desirable that all the light emitting diodes 3 be mounted at the predetermined interval P. However, in fact, the mounting interval of the light emitting diode-array chips 2 cannot be made uniform on the substrate 1, due to mounting errors.

That is, an interval Pa between light emitting diode 3 on the edge of a light emitting diode-array chip 2 (chip) and another light emitting diode 3 on the edge of an adjacent chip becomes different from the predetermined interval P. When the substrate 1, having non-uniformity in the intervals between the light emitting diodes, is used by an optical writing unit of an image forming apparatus, a resulting image output bears a black vertical line and a white vertical line, degrading the image quality. In view of the problem, JP,8-118722,A discloses a solution.

In the Japanese patent application, adjustment means are provided for adjusting the current supplied to the light emitting diodes on the edges of each light emitting diode-array chip. The means is provided in the driving circuit that supplies the driving current to each of the light emitting diodes. The driving circuit is included in a light emitting diode printing head, which also includes a plurality of the light emitting diode-array chips mounted on a substrate at a predetermined interval in the shape of a straight line. Each of the light emitting diode-array chips includes a plurality of light emitting diodes.

By adjusting the driving current of the light emitting diodes with the adjustment means, the light volume of the light emitting diodes on the edge of the light emitting diode-array chips can be increased or decreased. When the distance between the light emitting diodes on the edges of the adjacent light emitting diode array chips is too great, and a crevice is generated in the irradiation region of the drum, the luminous intensity of the light emitting diodes is increased by the adjustment means, thereby the white stripe is not generated in the printing result. However, in the case of JP,8-118722,A, the adjustment means is needed, and circuit arrangement becomes complicated as the result.

Further, according to the above-described means, only the luminous intensity adjustment of only the light emitting diodes on the edges of the light emitting diode-array chips is performed, which is insufficient as explained below using FIG. 4 that is also used for explaining the embodiment of the present invention. Namely, if Pa is greater than P, the above-described means increases-the light volume of the light emitting diodes in two vertical columns indicated by "a", in reference to FIG. 4, where a line C indicates the junction position of the two light emitting diode array chips, that are adjacent to each other, thereby the image dots D in the two vertical columns "a" are enlarged. The enlarged image dots may suppress the appearance of a white stripe at the junction position C of the two adjacent light emitting diode-array chips. However, since the image dots D of the vertical columns "a" are set greater, a black stripe may now appear at intervals marked by "b" between two columns of the light emitting diodes, one of the two columns being the column "a", and the other being the adjacent column within the same chip. For this reason, it is likely that the adjustment of only the light volume of the light emitting diodes only on the edges of the adjacent light emitting diode-array chips is insufficient to make the-white stripe and the black stripe inconspicuous.

As described above, according to the conventional technology, when a white stripe and black stripe arise in the printing result due to non-uniformity in the distance between the light emitting diodes on the edges of the light emitting diode-array chips, it is necessary to carry out one or any combination of re-mounting the light emitting diode-array chips on the substrate, providing the adjustment means for compensating for the differences in the distances of the light emitting diode-array chips, and providing other means, which complicates the circuit arrangement.

SUMMARY OF THE INVENTION

Accordingly, it is a general object of the present invention to provide an optical writing unit, a driving method thereof, and an image forming apparatus that substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by an optical writing unit, a driving method thereof, and an image forming apparatus, particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

The present invention provides an optical writing unit that makes vertical stripes appearing on a printing result inconspicuous, which dispenses with the conventional need for re-mounting light emitting device array chips.

The optical writing unit is made capable of driving such that each of the light emitting devices irradiates at a light volume that is predetermined by operation means.

The operation means includes measuring property values of the light emitting devices, wherein not all the light emitting devices have to be measured, but a certain correlative approach is taken in order to efficiently obtain compensation values for all the light emitting devices.

Here, through the entirety of this document, the property values refer to values that describe properties concerning exposure luminous intensity distribution of a light emitting device; the property values may be represented by, for example, exposure area at a threshold level, exposure width (PSF), integrated exposure width (LSF) and so on, as described in detail later.

The optical writing unit of the present invention can be provided with the capability of obtaining the compensation values on a real-time basis, without the need for measuring the property values.

The present invention provides the capability of adjusting the driving current for controlling the light volume and a light emitting time period of a light emitting device, thereby controlling an output image signal through an imaging process. The compensation values may be stored in a ROM included in the light emitting device array, in which case no signals for the compensation values are required from an external source.

When only the light volume of the light emitting device is set up by the compensating values, etc., complication of the driving circuit is avoided.

The present invention also provides an optical writing unit that suppresses appearance of a sharp vertical line, when an interval Pa between the light emitting devices on the edges of adjacent light emitting device array chips is different from a predetermined interval P.

The present invention measures property values of M light emitting devices, where M is a predetermined number, and is smaller than the total number of the light emitting devices. Further, more than a half of the M light emitting diodes to be measured are chosen from those on or near the edges of the light emitting device array chips (chips), with less than a half of the M light emitting diodes being chosen from places other than on or near the edges of the chips. This is for efficiently obtaining the compensation values.

The present invention also provides an image forming apparatus, to which the optical writing unit as described above is applied as an exposure unit, such that a sharp stripe does not appear in an effective image domain in its entirety.

The present invention predefines a permissible range of distribution of exposure intensity, such that each light emitting device is driven properly so that conspicuous stripes at the joint part of the light emitting device array chips are suppressed.

The present invention also provides the optical writing unit, wherein the adjustment of the light volume is carried out for a plurality of light emitting devices not only on the edge of the light emitting device array chip, but also the light emitting devices near the edge of the light emitting device array chip. This is carried out for making the vertical stripe inconspicuous, the vertical stripe being generated by the mounting error of the light emitting device array chips, without the need for raising the resolution of the compensation values.

The present invention uses, among other things, a gradient of an approximated (regressed) line of exposure areas. According to the present invention, the number of light emitting devices that are to be measured for obtaining the gradient is reduced. The reduction in number is realized by selecting a predetermined number of the light emitting devices at a predetermined interval, i.e., selecting one of every predetermined number of the light emitting devices, resulting in saving in measurement time and operation time, which realizes a low cost optical writing unit that is capable of generating even concentration in a printed image.

As a specific example for realizing the above, an extraction cycle is defined, wherein M light emitting devices are energized (i.e., are irradiating) and N light emitting devices are not energized (not irradiating), M+N constituting the period of the cycle. Here, M is set equal to or smaller than N, such that the gradient of the approximated (regressed) line of the exposure areas can be obtained in a short measuring time and a reduced operation time.

In the present invention, the interval between adjacent light emitting devices is made smaller than 1/10 of the interval between adjacent image forming devices, such that the variation in the shape of optical spots generated by the adjacent light emitting devices is suppressed, change in the shape of the optical spots in reference to a certain evaluation width (distance equivalent to a plurality of light emitting diodes) is detected, and the optical writing unit is capable of providing a high-quality image without vertical stripes.

The present invention also provides an optical writing unit that suppresses the appearance of vertical stripes generated due to the mounting error of the light emitting device array chips by properly extracting defects in optical properties of the image forming devices through obtaining an approximated (regressed) straight line of the exposure area of a plurality of light emitting devices corresponding to a distance range, such as a range between LK and 3LK, and a range between 0.5LK and 1.5 LK, where LK (mm) represents the interval between adjacent image forming devices.

According to the present invention, intervals between the adjacent light emitting devices on the edges of the light emitting device array chips are categorized in ranks; and the light volume is set up for each of the ranks, such that a specific gradient of the approximated (regressed) line is assigned to each of the ranks.

The number of the ranks can be three, namely, Pa<PL, PL<=Pa<=PH, and PH<Pa, wherein PL and PH (PL<PH) are predetermined intervals between light emitting devices, and Pa represents the interval between the adjacent light emitting devices on the edges of the light emitting device array chips. The predetermined intervals may be set at PL=0.9P and PH=1.1P, for example. Arranging the ranks in the manner such as described above provides a specific standard for exactly determining the status of the gradient of the approximated line that should be set up, such that the light volume is efficiently set up.

The present invention provides the compensation value for the driving current such that a greater light volume is emitted from the light emitting devices near the edge of the light emitting device array chips when Pa>PH, and a lesser light volume is emitted from the light emitting devices near the edge of the light emitting device array chips when Pa<PL. In this manner, the vertical stripe becomes inconspicuous without complicating the driving circuit.

The present invention also provides the image forming apparatus that includes the optical writing unit as described above.

The present invention further provides the driving method for the optical writing unit as described above.

BRIEF DESCRIPTION OF THE DRAWINGS

FIG. 28 shows relations between a position of each light emitting device and exposure area in the case that two consecutive dots are turned on, two following consecutive dots are turned off, and so on;

DESCRIPTION OF THE PREFERRED EMBODIMENTS

In the following, embodiments of the optical writing unit, the driving method thereof, and the image forming apparatus of the present invention will be described with reference to the accompanying drawings.

Figure 1:
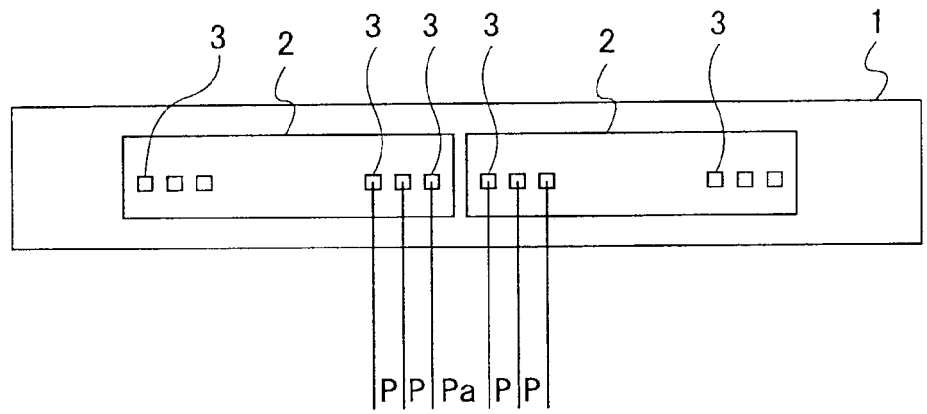
FIG. 1 is a plan view for explaining an interval of light emitting devices that are arranged on a light emitting device array chip of an optical writing unit according to the present invention.

First, in order to facilitate an understanding of the present invention, the outline of the present invention, contents of experiments performed by the inventor of the present invention, matters discovered in the process of invention, etc. are explained, in advance of specific explanations of the embodiments. As previously explained with reference to FIG. 1, it is desired that all of the light emitting devices, such as the light emitting diodes 3, be arranged at a predetermined uniform interval over the entirety of the effective image domain. Since the light emitting device applicable to the present invention is not limited to a light emitting diode, the following explanation refers to a light emitting device in general terms. As shown in FIG. 1, a plurality of light emitting devices are installed in each of a plurality of light emitting device array chips 2 (chips) that are installed on a substrate 1, where the light emitting devices 3 of the light emitting device array chips 2 are desirably installed at a uniform predetermined interval P, which is achieved in most of the cases.

However, the interval of the light emitting device array chips 2 cannot be made uniform in fact due to an error in accuracy when mounting the light emitting device array chips 2 to the substrate 1. That is, an interval Pa between the light emitting devices 3 on the edges of adjacent light emitting device array chips 2 tends to differ from the predetermined interval P. Then, the inventor of the present invention, et al., experimented with the optical writing unit that includes the light emitting device array and the image forming device array, serving as an exposure unit, mounted on an image forming apparatus, and obtained an image output. As an image pattern, a 1 on-2 off pattern was used, that is, a set of "a dot irradiating, and the next 2 dots not irradiating" was repeated, which made a vertical-line image parallel to the moving direction of a photo conductor. In this image, a black stripe and a white stripe in the moving direction of the photo conductor were observed. The vertical stripes were dividable into two kinds from appearance. One was a vertical stripe with a width of about 0.5–1 mm, and the other was a sharp (thinner) vertical stripe. The former was generated by concentration unevenness, and the latter was due to the non-uniformity of the vertical-line interval.

Where the former (wider) vertical stripe was generated, there was a correspondence relationship between property values of the exposure intensity distribution of optical spots and the concentration unevenness appearing on the image. The concentration unevenness (namely, vertical stripe) can be suppressed by "setting up the light volume of the emitting devices such that the predefined property values in the exposure intensity distribution of the light emitting devices fall within a predetermined range over the entire effective image domain."

As for the latter stripe, as a result of an analysis of the image by the inventor, et al., a certain relationship between the vertical-line interval and the appearance of the sharp vertical stripe was found. That is, if the vertical-line interval was less than a certain interval, a black stripe was conspicuous, and if the vertical-line interval was greater than the certain interval, a white stripe was conspicuous. The vertical-line interval is exactly the interval of the optical spots exposed by the optical writing unit. In the optical writing unit constituted by the light emitting device array and the image forming device array, a so-called "unit magnification image forming device" is used as the element for image formation, and the image from the light emitting devices, which are arranged at the predetermined interval, is formed as the optical spot as it is (unit magnification), i.e., without being enlarged or reduced.

As described above, the variation in the interval between the light emitting devices caused the variation in the interval of the vertical lines (in addition, the variation in image-formation properties of the image forming device array causes the variation in an optical spot position to some extent). Further, relations between the vertical line interval and the light emitting device interval were researched through experiments, concerning the portion that is conspicuous as a sharp vertical stripe, and the portion that is inconspicuous. Results were as follows. If the interval Pa of the light emitting devices on the edges of the light emitting diode array chips was smaller than the predetermined interval P (P=42.3 micrometers at the time of 600 dpi) by more than 10% (Pa<0.9P), a black stripe was recognized; and a white stripe was recognized when the Pa was greater than P by more than 10% (Pa>1.1P).

Next, a method for making the vertical stripes (the white stripe and the black stripe) inconspicuous by adjusting the luminous intensity of the light emitting devices on the edges of the light emitting device array chips is described.

Figure 2:
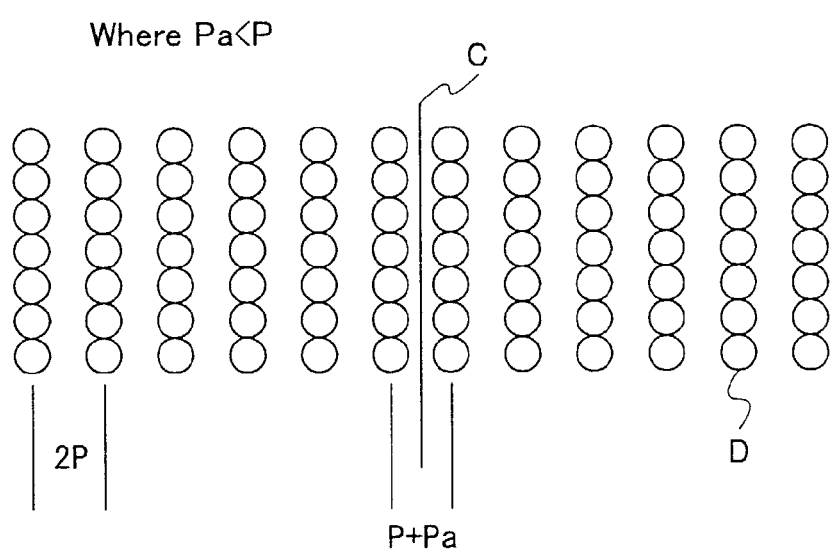
FIG. 2 is a schematic diagram of image dots when the interval between a light emitting device on the edge of a light emitting device array chip (chip) and another light emitting device on the adjacent edge of an adjacent chip is smaller than a predetermined interval, the chips being used it the present invention.

FIG. 2 schematically shows image dots D. In FIG. 2, the junction position of the two light emitting array chips is indicated by "C", and the interval between the light emitting devices at C, i.e., on the edges of the adjacent light emitting device array chips is indicated by "Pa", where Pa is smaller than the predetermined interval P (Pa<P).

Figure 3:
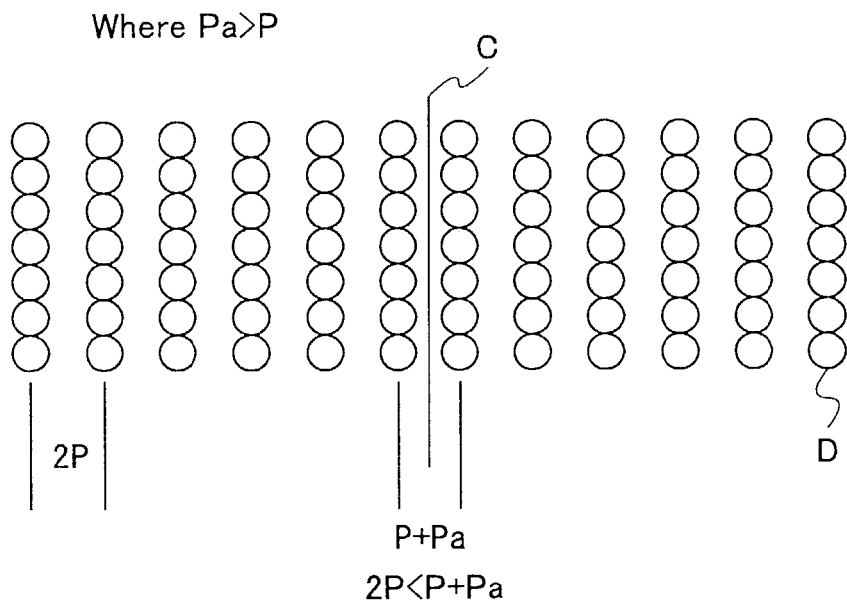
FIG. 3 is a schematic diagram of image dots when the interval between a light emitting device on the edge of a light emitting device array chip (chip) and another light emitting device on the adjacent edge of an adjacent chip is greater than the predetermined interval, the chips being used in the present invention.

FIG. 3 schematically shows image dots D, where a junction position of the two light emitting array chips is indicated by "C", and the interval between the light emitting devices at C, i.e., on the edges of the adjacent light emitting device array chips, is indicated by "Pa", where Pa is greater than the predetermined interval P (Pa>P).

FIG. 2 and FIG. 3 represent the case where every other dot is turned on, namely, a 1-on and 1-off pattern, which produces an image of vertical lines parallel to the moving direction of the photo conductor (image supporting object, drum). As shown in FIG. 2, in the case of Pa<P, the interval (P+Pa) of the vertical lines closest to the junction position C of the two light emitting array chips is smaller than the vertical line interval (2P) of other positions, and a sharp black stripe is visibly recognized. On the other hand, as shown in FIG. 3, in the case of Pa>P, the interval (P+Pa) of the vertical lines closest to the junction position C is greater than the vertical line interval (2P) of other positions, and a sharp white stripe is visibly recognized. In order to make the stripes less conspicuous, the magnitude of an image dot D that forms one vertical line can be adjusted. That is, in the case of Pa<P shown in FIG. 2, the black stripe, being conspicuous due to the vertical line interval being too small, is made less conspicuous by thinning the vertical lines.

Figure 4:
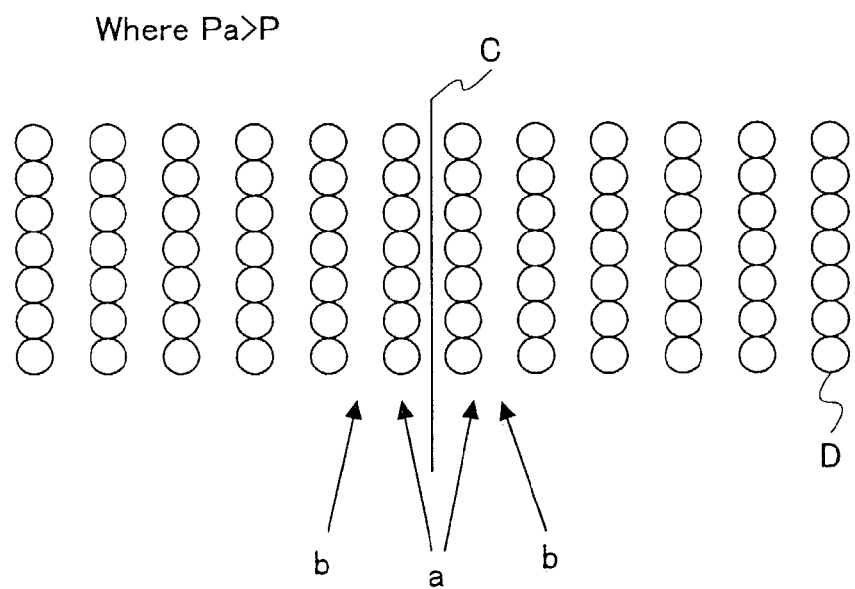
FIG. 4 is a schematic diagram for explaining an inadequate state, in which a black stripe is conspicuous, even when only light volume of only the light emitting devices on the edge of each adjacent light emitting device array chip is adjusted, where the interval of the light emitting devices on the edges of the adjacent light emitting device array chips is greater than the predetermined interval.

Specifically, the light volume of the light emitting device corresponding to the vertical line is decreased, such that the magnitude of the corresponding image dot D is made smaller. In this manner, the difference in concentration between the vertical lines and their respective peripheral areas is made smaller, such that the vertical stripe is made less conspicuous. Conversely, in the case of Pa>P, as shown in FIG. 3, the light volume of the light emitting devices corresponding to the vertical lines is increased, such that the magnitude of the corresponding image dot D is made greater. In this manner, the white stripe is made less conspicuous. However, as above-mentioned with reference to JP,8-118722,A, the adjustment of only the light volume of only the light emitting devices on the edges of the adjacent light emitting device array chips is insufficient. The reasons follow. One of the reasons is that when the light volume of the light emitting devices corresponding to the two vertical lines,"a" is increased, the corresponding image dots. D are enlarged, and the white stripe in the portion of the junction position C is made less conspicuous. However, as shown in FIG. 4, the intervals indicated by "b" on the sides of the lines "a" opposite to C can be recognized as a black stripe, since the image dots corresponding to the vertical lines "a" are enlarged.

Furthermore, as another reason, there is the case where the adjustment of only the light volume of only the light emitting devices on the edge of the light emitting device array chips is insufficient, because there is a limit in the range of the adjustment. Accordingly, the present invention carries out the adjustment of the light volume of not only the light emitting devices on the edges of the light emitting device array chips, but also of the light emitting devices near the edges. In this manner, the vertical stripe (the latter sharp vertical stripe) due to the mounting error of the light emitting device array chips is made less conspicuous, and the concentration unevenness (the former vertical stripe having the width) is made less conspicuous without the need for raising the resolution of compensation values. The present invention provides an optical writing unit that is capable of the above, providing optimum light volume over the entire effective domain; and a driving circuit that is not complicated.

Figure 5:
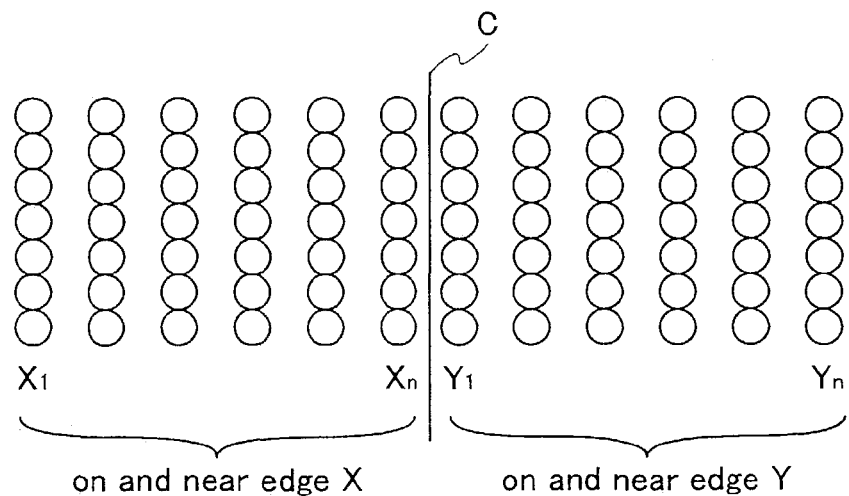
FIG. 5 is a schematic diagram for explaining an adjustment of the light volume of a plurality of light emitting devices near the edge of each adjacent light emitting device array chip, when the interval of the light emitting devices on the edges of the adjacent light emitting device array chips applied to the optical writing unit concerning the present invention is greater than the predetermined interval.

Specifically, according to the present invention, the adjustment of the light volume is carried out for the light emitting devices installed on and near the edges of a light emitting device array chips, the process of which is explained below, with reference to FIG. 5. In the case of Pa>P (as shown in FIG. 4), the light volume of the light emitting devices X1 through Xn and the light emitting devices Y1 through Yn, shown in FIG. 5, are adjusted. The adjustment should be arranged such that the sharp vertical line due to Pa being different from P and the vertical line having a width due to the unevenness of concentration are made inconspicuous.

As for the latter, namely, the vertical line having a width, the light volume of the light emitting devices should be set up such that a predefined property value concerning the exposure intensity distribution falls within a predetermined range for the entirety of the effective image domain. Further, as for the former, namely, the sharp vertical line, the property value of the light emitting devices on and near the edges of light emitting device array chips should be set up either greater than or smaller than the property value of the light emitting devices in other places (i.e. places other than the vicinity of the edge of the light emitting device array chip) as required.

Next, an embodiment that uses a moving average of the exposure areas of a plurality of light emitting devices is explained with reference to FIG. 6. Here, the property value is defined as the exposure area at a predetermined threshold value. The "exposure area at a predetermined threshold" means a cross-sectional area of the exposure intensity distribution curve at the threshold value, as shown in FIG. 7.

Figure 8:
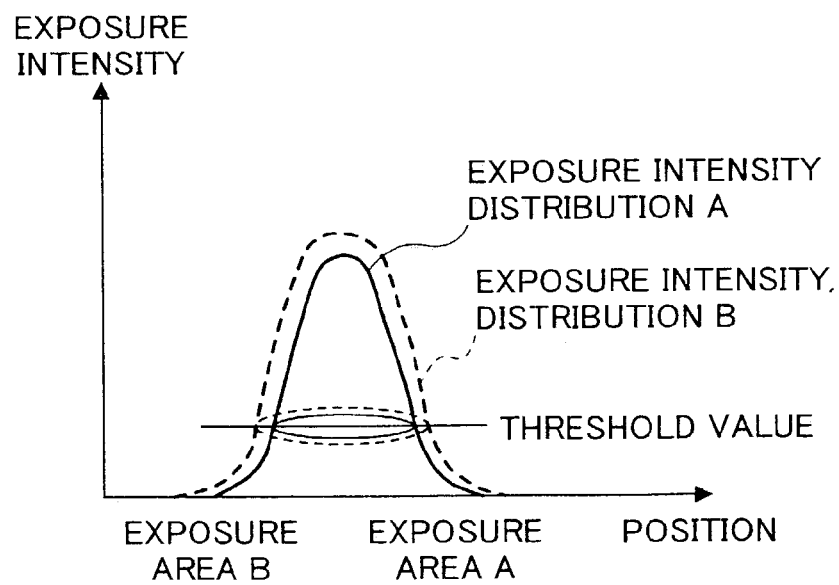
FIG. 8 is a diagram showing that a stronger exposure intensity distribution A provides a wider exposure area A at a threshold level, than a weaker exposure intensity distribution B that provides a narrower exposure area B at the threshold level.

In order to make the vertical stripe with a width due to concentration unevenness inconspicuous, the light volume of the light emitting devices at and near the central part of the light emitting device array chip, that is, other than those on and near the edges of a light emitting device array chip, is set up so that the moving average of the exposure areas of the light emitting devices falls within a predetermined range. With reference to FIG. 6, the predetermined range is delimited by SH that is the highest, SL that is the lowest, and SC that is the median of SH and SL. Usually, the light volume is set up so that a moving average near the median SC of the set-up range is obtained. The moving average of the exposure areas is distributed near SC. In the case of Pa>P, the image dots corresponding to the light emitting devices on and near the edge of a light emitting device array chip are enlarged so that a sharp white stripe, which is often generated at the junction position C of two light emitting array chips, become inconspicuous. That is, in order to enlarge the image dots, the light volume should be increased. That is, the exposure area should be enlarged, making the moving average become greater. That is, when the light volume is set up greater, as shown by the schematic diagram of the exposure area of FIG. 8, the exposure area at a certain threshold becomes greater (exposure area A is enlarged to exposure area B).

Figure 6:
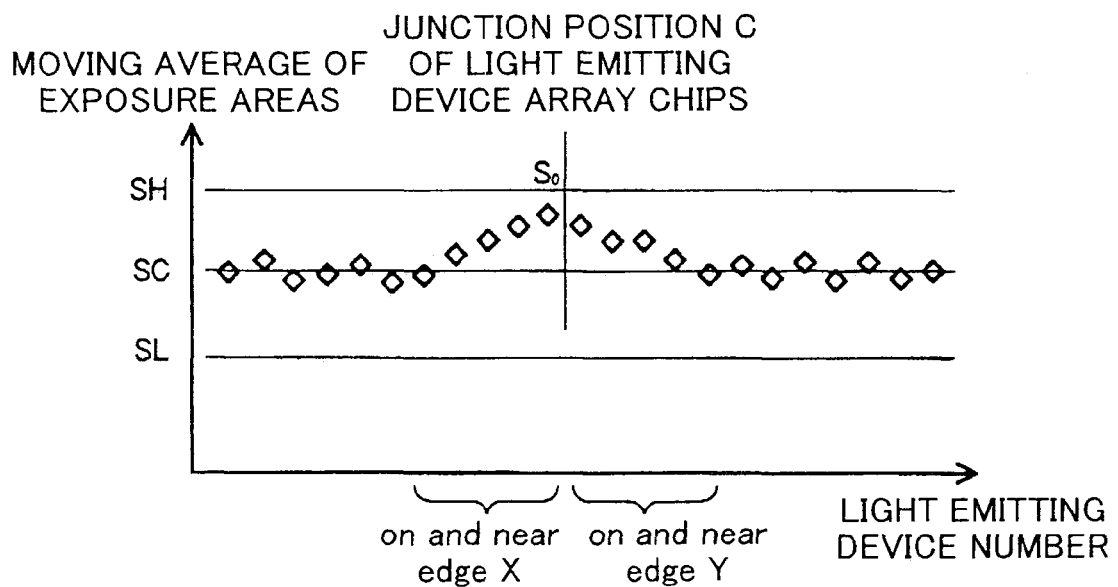
FIG. 6 is a diagram showing the case wherein a property value of the exposure intensity distribution of the light emitting devices is defined by a moving average of the exposure area at a certain threshold value.
Figure 7:
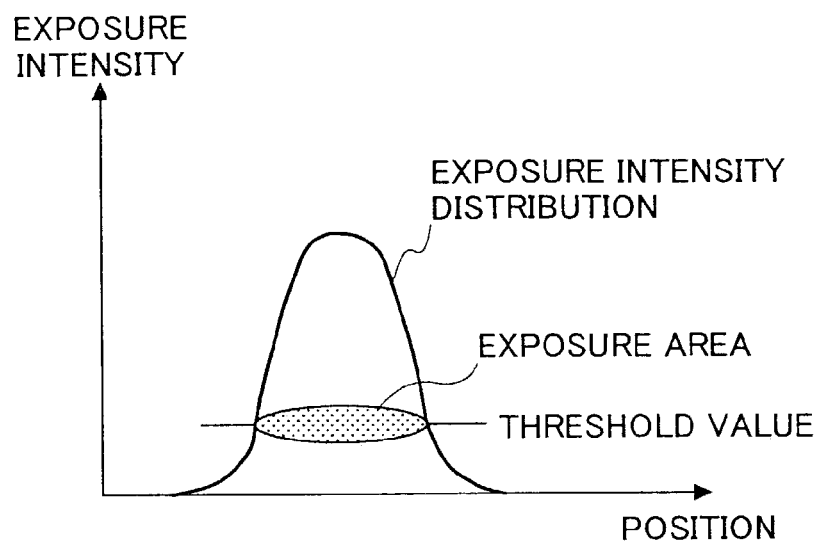
FIG. 7 is a diagram showing the case wherein the predefined property value of the exposure intensity distribution of the light emitting device is defined by the cross section area of the exposure area at a certain threshold of the exposure intensity distribution curve.

A moving average of the exposure area S is allowed to be as great as SH near the edge of the light emitting device array chip as shown in FIG. 6. By setting S to be greater than SC and less than SH, i.e. SC<S<SH, the sharp white stripe and vertical stripe with width (due to concentration unevenness) can be made inconspicuous. Furthermore, the moving average S0 of the exposure area on the edge of the light emitting device array chip can be set as (SH+SC)/2<S0<SH, which more effectively makes the sharp white stripe inconspicuous. Conversely, in the case of Pa<P, the image dots corresponding to the light emitting devices near the edge of the light emitting device array chip should be set smaller such that the sharp black stripe generated at the junction C of the light emitting device array chips is made inconspicuous. Therefore, the light volume the light emitting devices should be set smaller.

That is, the exposure area should be set smaller, with the moving average becoming smaller. Near the edge of the light emitting device array chip, the moving average S can be as small as SL of the allowed range as described above. By setting as SL<S<SC, the sharp black stripe and vertical stripe with width (due to concentration unevenness) can be made inconspicuous. Further, by setting the moving average S0a of the light emitting device on the edge of the light emitting device array chip as SL<S0a<(SL+SC)/2, the sharp black stripe can be more effectively made inconspicuous. Next, how the relation between Pa and P is determined is explained.

A first method is to beforehand measure the interval between the light emitting device on the edge of a light emitting device array chip and another light emitting device on the edge of an adjacent light emitting device array chip (adjacent light emitting devices on the edges). As a second method, the interval between the optical spots corresponding to the adjacent light emitting devices on the edges of the light emitting device array chips may be measured, the optical spots being generated by image-formation carried out by the image forming device array. As for the measurement, for example, a center-of-gravity interval of the optical spots may be measured. The interval between the optical spots can be considered as representing the interval between the adjacent light emitting devices, such as Pa and P.

The above-described measurement is generally carried out with the light emitting device array (including light emitting device array chips that further include light emitting devices) installed in an optical writing unit. In this manner, each light emitting device irradiates, exposure intensity (or distribution thereof) of the optical spot obtained is measured, and the optical writing unit is set up. It is easy to obtain the center-of-gravity interval of the optical spots from the measured exposure intensity distribution. Further, according to this method, setting up of the light volume can be carried out for all light emitting devices, not only the light emitting devices on the edges of the light emitting device array chips. Further, according to this method, setting up can be carried out including compensation for variations in the image-formation properties of the image forming device array. Thus, this is a desirable method.

Further, as a third method, a vertical line interval can be measured by beforehand outputting an image of the vertical line by the image forming apparatus that includes the optical writing unit. The vertical line interval can be considered to be representing the interval of the corresponding light emitting devices, such as Pa and P. According to this method, the light volume of each light emitting device can be set up not only considering an influence of the optical writing unit but also the influence of the image forming apparatus. This method is effective for making the sharp vertical stripe inconspicuous, especially when the difference between P and Pa is great, i.e., |P−Pa|>0.1P. When the difference between P and Pa is small (i.e., P nearly equals to Pa), the vertical stripe can be made inconspicuous, even if S0 and S0a do not fall within the above-described range. Here, in the above explanation, although the exposure area is used as the property value, other property values may be used, such as the exposure width (PSF) in the array direction or the direction perpendicular thereto as shown in FIG. 9, and the integrated exposure width (LSF) that is an integration of the exposure area in the array direction or the direction perpendicular thereto as shown in FIG. 10.

Figure 9:
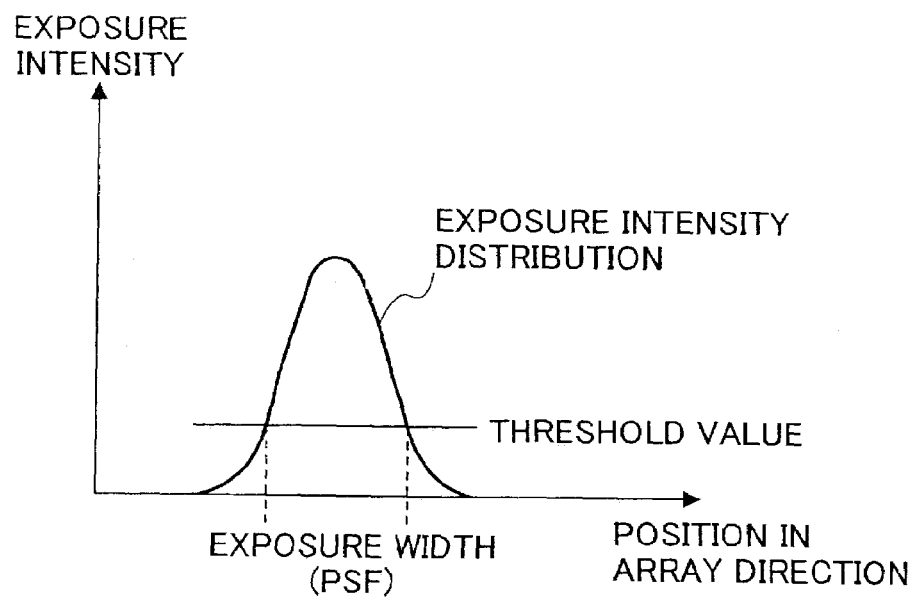
FIG. 9 is a diagram explaining the case where the predefined property value is defined by the width at a threshold level of the exposure intensity distribution curve in the direction in which the light emitting devices are arranged (as shown), or alternatively perpendicular thereto.
Figure 10:
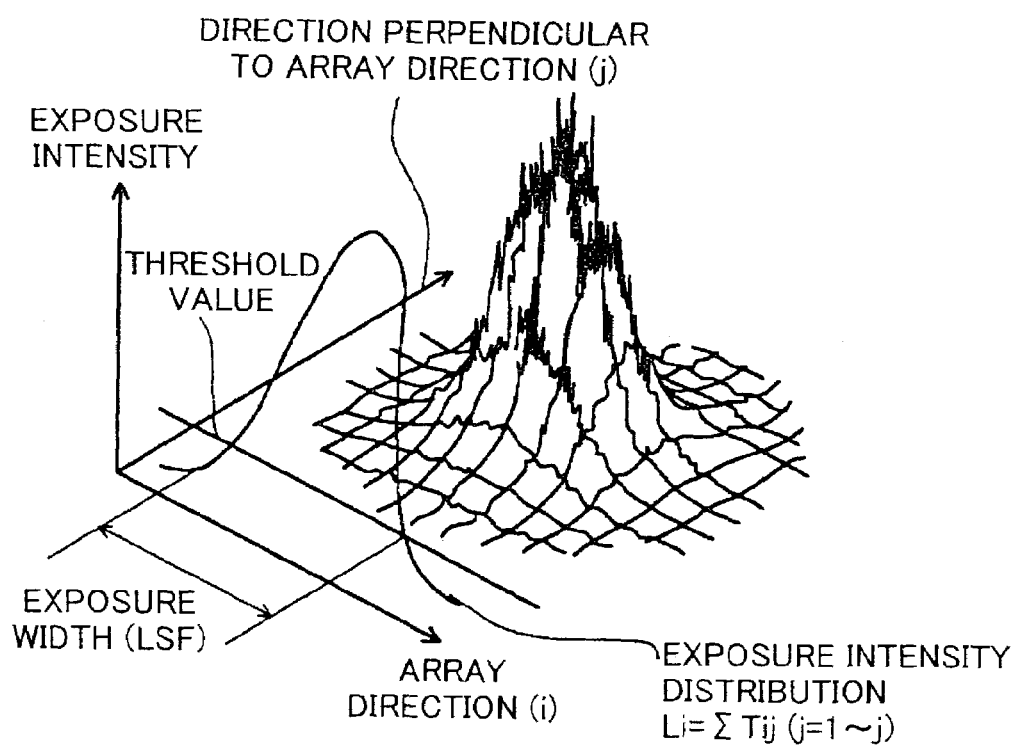
FIG. 10 is a diagram explaining the case where the predefined property value is defined by an integration of the exposure width, integration being in the direction in which the light emitting devices are arranged, or perpendicular thereto.
Figure 11:
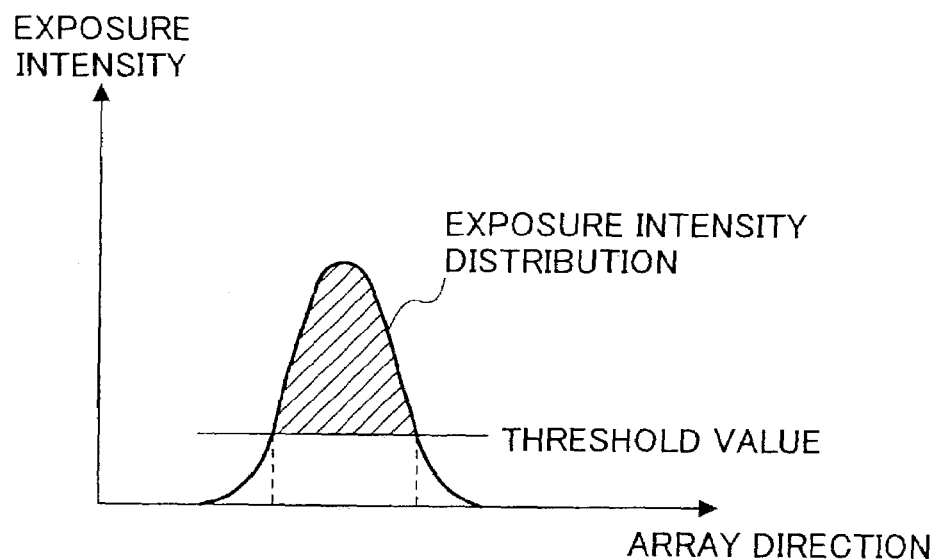
FIG. 11 is a diagram explaining the case where the predefined property value is defined by an integral amount of the light exposure that exceeds a certain threshold.
Figure 12:
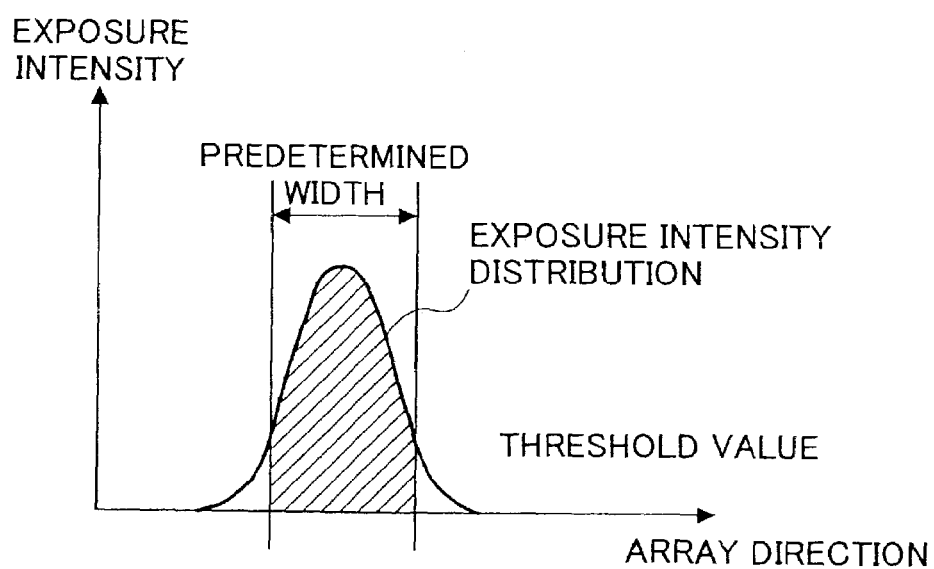
FIG. 12 is a diagram explaining the case where the predefined property value is defined by an integral amount of the light exposure within a certain predetermined width.

The integrated exposure width (LSF) serves as a property value that contains more information about the intensity of the whole distribution than the exposure width (PSF) in the array direction or the direction perpendicular thereto as shown in FIG. 9. Further, the property value can be defined in other terms, such as an integrated exposure amount and a peak exposure amount, which represent an amount, rather than a geometric quantity, such as the exposure width and the exposure area. Here, the integrated light exposure amount may be defined by an integration of the light exposure amount greater than a certain threshold as shown in FIG. 11. Alternatively, the integrated light exposure amount may be defined by an integration of the light exposure amount within a certain predetermined width as shown in FIG. 12. Further, a plurality of property values described above may be used, and various combinations of the plurality of property values may be used. For example, the property value may be defined by the exposure width (PSF) in the array direction and the exposure width (PSF) in the direction perpendicular to the array direction. Alternatively, the property value may be defined by a relational expression with the exposure area and the integrated exposure amount serving as variables. Further, in above-mentioned explanation, although the moving average of the exposure areas corresponding to the light emitting devices is examined, using the exposure area as the property value, the gradient of the approximated line (refer to FIG. 21) can be examined.

When defining the property values, it is desirable to carefully analyze correspondence of the property values with the output image.

Next, an operating process of the optical writing unit is explained, whereby driving of each light emitting device is controlled based on the light volume to be irradiated by each light emitting device, the light volume being determined by operating means.

Figure 13:
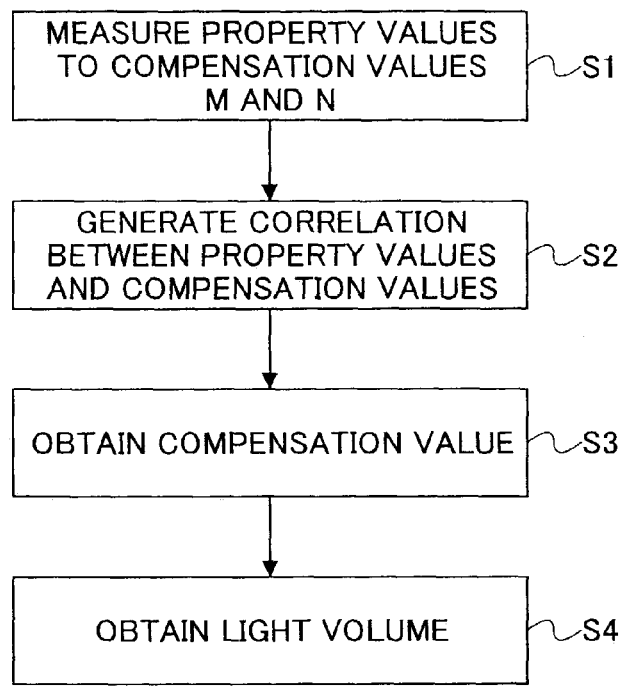
FIG. 13 is a flowchart explaining a process for controlling the light volume of the light emitting devices of the adjacent light emitting device array chips used in the optical writing unit of the present invention.

Example 1 of the operating process is explained with reference to a flowchart in FIG. 13. First, to each light emitting device, two compensation values m and n are assigned, where each compensation value can take four bits, capable of expressing 0 through 15, and can control the driving current according to the compensation value. Then, the light emitting device irradiates a light based on the assigned compensation values, and property values relative to the exposure intensity distribution, corresponding to each of the compensation values, are measured (step S1). For this measurement, a known method can be used, such as 2-dimensional CCD, 1-dimensional CCD, and a method using a slit.

From the results of this measurement, a correlation curve of the compensation value vs. the property value for each light emitting device is generated (step S2). Based on the correlation curve, an appropriate compensation value for each of the light emitting devices is calculated such that the compensation value provides a property value that falls within a predetermined range for the entire effective image domain (step S3). Then, the light volume can be calculated based on the appropriate compensation value (step S4).

Figure 14:
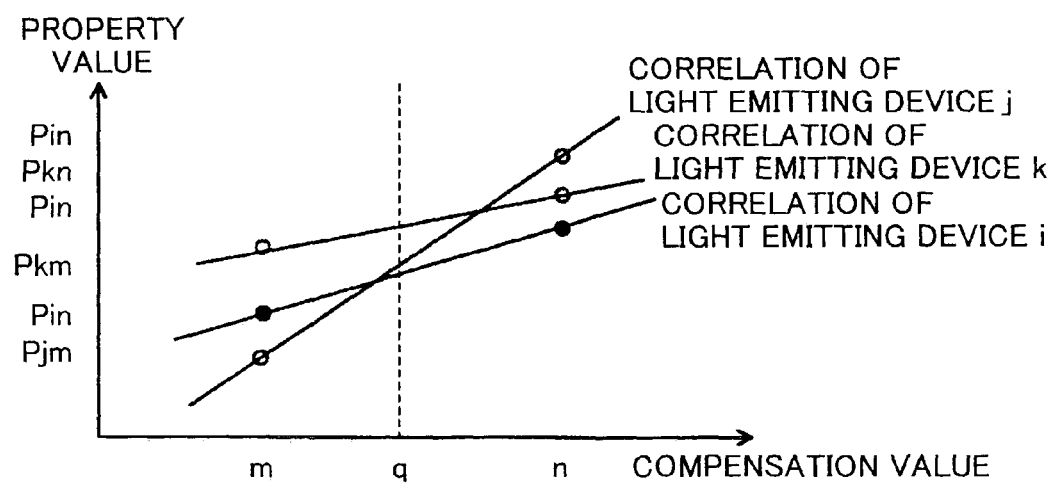
FIG. 14 shows correlations between compensation values and property values, the compensation values being provided to the light emitting devices of the adjacent light emitting device array chips for irradiation, and the property values being obtained by measurements.

Further explanation follows. The correlation of the compensation value vs. the property value is obtained by measuring predefined property values relative to the exposure intensity distribution of the light emitting devices in the effective image domain corresponding to the compensation values m and n, as shown in FIG. 14. The process of the measurement is such that, first, a light emitting device i is energized (turned on) with the compensation value m, the property value is measured, and a measurement result Pim is obtained. Then, the compensation value n is applied, the property value is measured, and a measurement result Pin is obtained. Next, a light emitting device j is energized with the compensation value m, the property value is measured, and a measurement result Pjm is obtained. Then, the compensation value n is applied, the property value is measured, and a measurement result Pjn is obtained. In the manner similar to above, the measurements are made on a light emitting device k, and property values Pkm and Pkn are measured and obtained. Henceforth, the measurements as above are carried out for all the light emitting devices in the effective image domain.

The process of the measurement does not have to be strictly in the sequence described above. Measurements may be first carried out with the compensation value m for all the light emitting devices i, j, k, and so on, and then, measurements are carried out with the compensation value n for all the light emitting devices i, j, k, and so on, obtaining the same results as described above.

From the measurement results, the correlations of the compensation values vs. the property values of all the light emitting devices i, j, and k and so on are obtained. Here, each of the correlations is assumed to be linear, and gradient ai and intercept bi of the light emitting device i are obtained by solving a simultaneous equation of $$Pim = aixm + bi$$

$$Pin = aixn + bi.$$

Similarly, gradients aj and ak, and so on, and intercepts bj, bk, and so on of the light emitting devices j and k, and so on, respectively, are obtained. In this manner, the correlations between the compensation value and the property value as shown in FIG. 14 are obtained.

Figure 15:
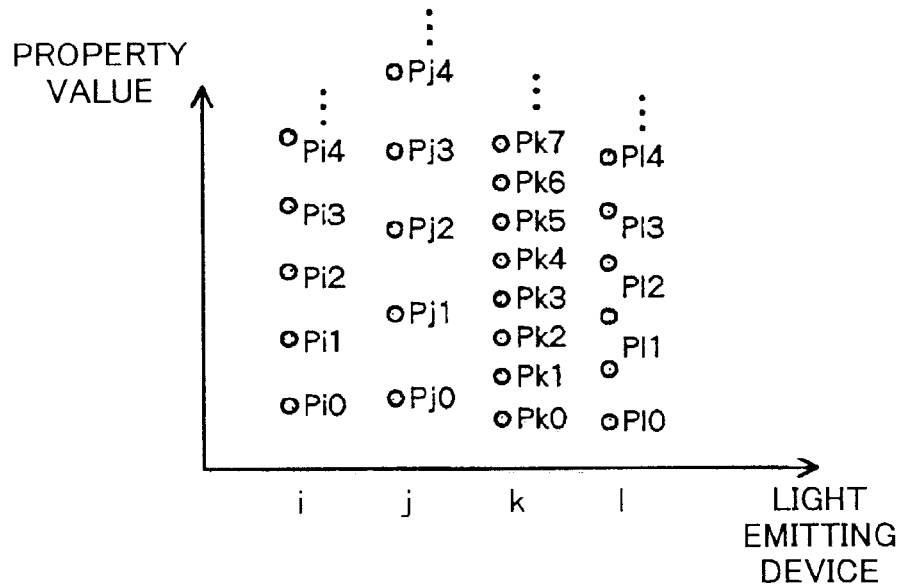
FIG. 15 is a diagram for explaining correlations between the property values and the compensation values, which is used for ascertaining a property value when a compensation value is adopted.

Based on the correlation of each of the light emitting device i, j, and k and so on, property values Piq, Pjq, and Pkq and so on, respectively, corresponding to an arbitrary compensation value q, are obtained (refer to FIG. 15). Namely, $$Piq = aixq + bi$$

$$Pjq = ajxq + bj$$

$$Pkq = akxq + bk \text{ and so on.}$$

The operating process uses results of these calculations, and determines the compensation value for all the light emitting devices corresponding to the entire effective image domain, the compensation value for the light emitting device providing a property value that falls within the predetermined range.

Figure 16:
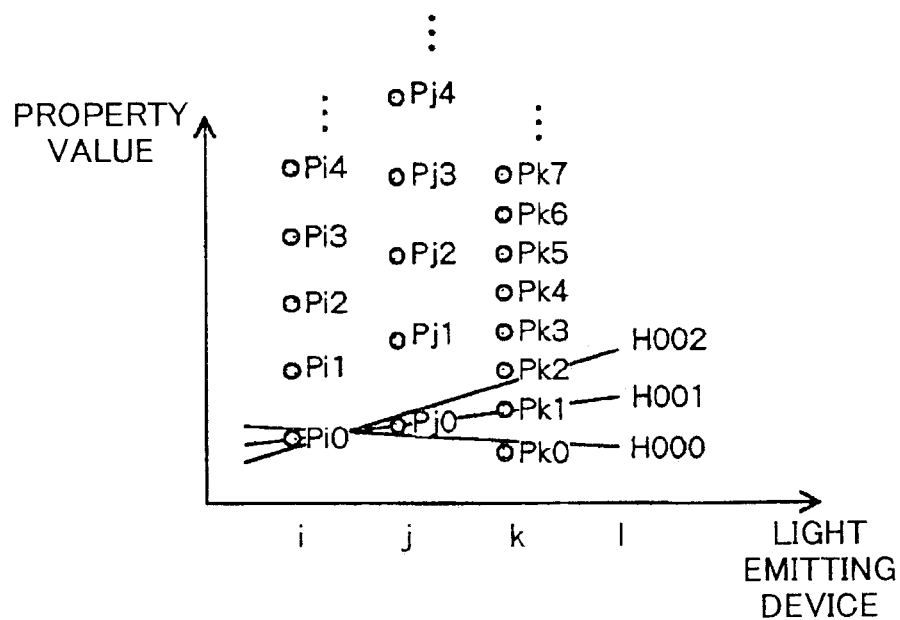
FIG. 16 is a diagram for explaining how an approximated slope (gradient) of an approximated (regressed) line is obtained, using the least square regression, the line approximately representing the property values of a plurality of the light emitting devices.

Details of the operating process follow, taking an example where the property values of a plurality of light emitting devices are considered as forming a straight line (approximated straight line) by using the least square approximation of the property values. First, three light emitting devices i, j, and k are considered, having property values Piu, Pjv, and Pkw, respectively. The slope of an approximated (linear regressed) line for the three property values, i.e., the gradient, is expressed by Huvw. Here, the suffix u refers to the compensation value of the light emitting device i, the suffix v refers to the compensation value of the light emitting device j, and the suffix w refers to the compensation value of the light emitting device k. That is, H000 represents the slope of the approximated line representing Pi0, Pj0, and Pk0; H001 represents the slope of the approximated line representing Pi0, Pj0, and Pk1; H002 represents the slope of the approximated line representing Pi0, Pj0, and Pk2 (refer to FIG. 16); and so on. In this manner, values of gradient Huvw for all combinations of u, v, and w, each of which is independently shifted from 0 to 15, are obtained. Then, a combination of u, v, and w, which provides a property value within the predetermined range between HL and HH, is obtained. In other words, an Huvw value that satisfies HL<=Huvw<=HH is obtained.

Next, light emitting devices j, k, and l are considered, that is, the target light emitting devices are shifted. The same process as above is carried out, and a gradient value Hvwx that provides a property value within the predetermined range is obtained. (Here, x refers to the compensation value of the light emitting device 1.) In this manner, the process is repeated until the compensation values are obtained for all the light emitting devices to provide satisfactory property values in the entire effective image domain. That is, the light volume required for each light emitting device to irradiate is obtained. Further, although precise correlations can be obtained if the number of compensation values is increased when obtaining the property values corresponding to the compensation values, the time for the measurement becomes long. Therefore, actual practice is to anticipate what correlations are present between the compensation values and the property values. If it is considered that a linear regression is sufficient, two compensation values per light emitting device are used. Otherwise, i.e., if the linear regression is not considered appropriate, three or more compensation values are used per light emitting device, such that a higher-degree (multi-dimensional) correlation curve is obtained. In practice, two to four compensation values per light emitting device are adequate.

In the case that the integrated exposure width (LSF) (or the like) is employed as the property value, the measurement can be carried out faster than measuring the 1-dimensional exposure intensity-distribution using the slit, etc.

Figure 17:
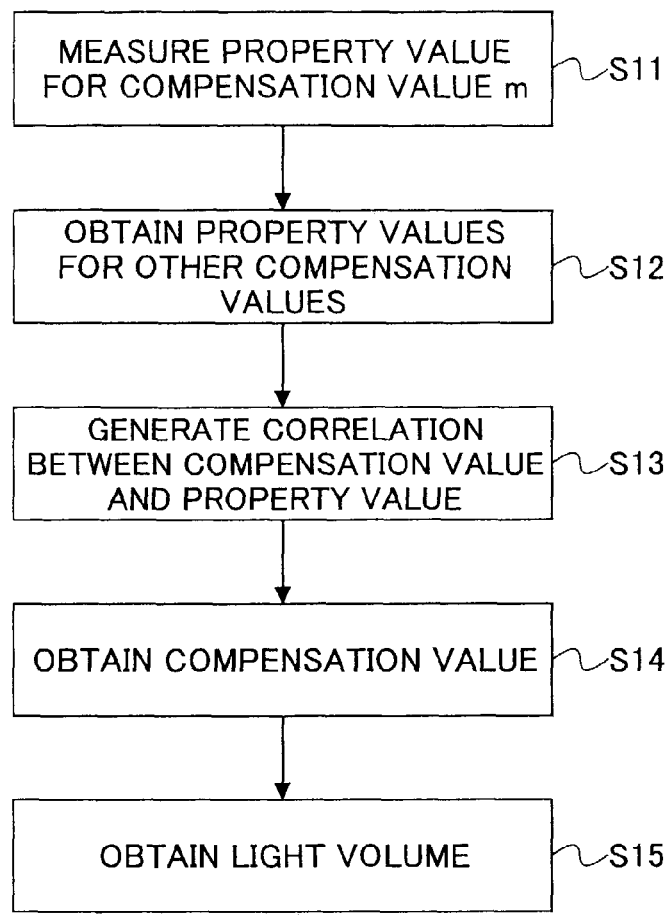
FIG. 17 is a flowchart explaining another (second) process for controlling the light volume of the light emitting devices of the adjacent light emitting device array chips used in the optical writing unit of the present invention.

Example 2 of the operating process is explained with reference to a flowchart in FIG. 17. In order to obtain a predefined property value concerning the exposure intensity distribution, corresponding to a compensation value, a 2-dimensional exposure intensity distribution is measured using a 2-dimensional CCD, and the likes with each light emitting device irradiating based on the compensation value. Since the light volume changes almost proportionally to the driving current, if an amount of change in the driving current that causes one step of change in the compensation value is known, a change in the light volume corresponding to the step of the compensation value change can be estimated. Although the change in the light volume is almost proportional to the driving current, the constant of proportion is different from light emitting device to light emitting device. Therefore, it is necessary to beforehand measure the constant of each light emitting device. For this purpose, a "probing test" performed in a process of manufacturing light emitting device array chips is used, the probing test being performed when the chips are in a wafer, and determining whether a light emitting device emits a light.

Figure 18:
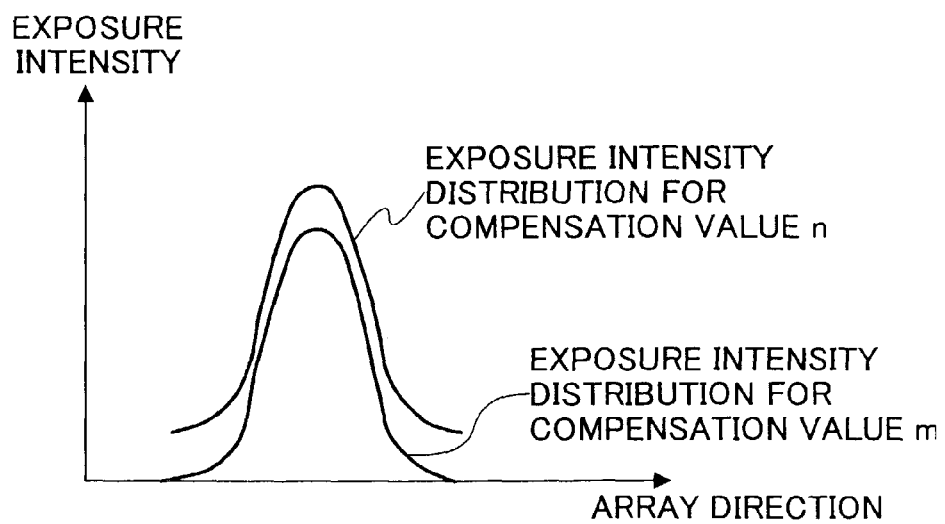
FIG. 18 is a diagram showing how the distribution of the exposure intensity changes corresponding to different compensation values of the light volume of the light emitting device on the edge of a light emitting device array chip.
Figure 19:
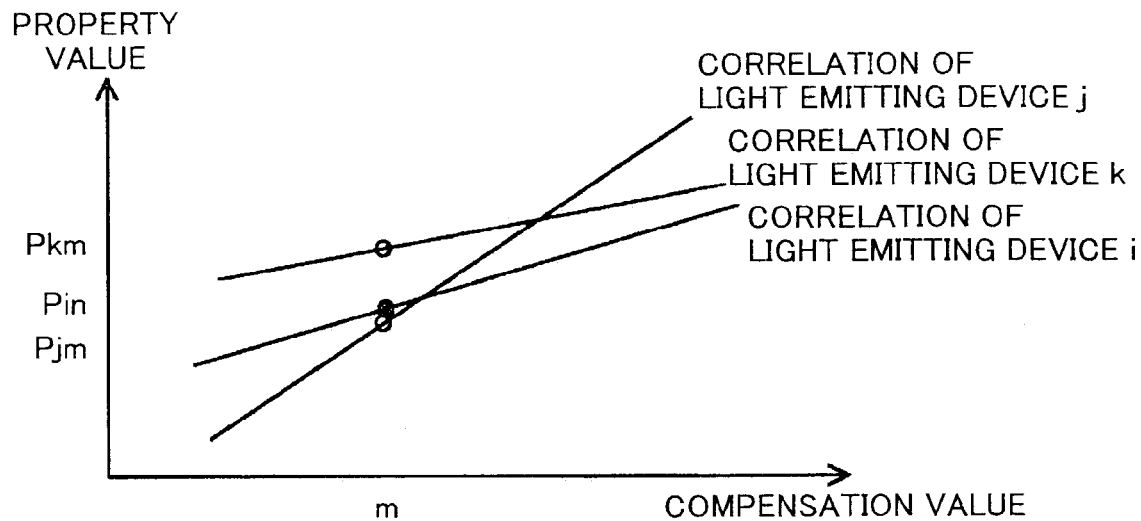
FIG. 19 is a diagram showing correlations between the compensation values and the property values of the light volume of the light emitting device of the light emitting device array chip of the present invention.

In a usual manufacturing practice, only one level of the driving current is provided, and screening and selection of the light emitting device array chips are carried out based on the light volume. At this time, if measurements are carried out with two levels of the driving current, the constant of proportion of every light emitting device can be obtained and stored (Step S11). Furthermore, when the driving current is increased and the light volume is increased, the shape of the exposure intensity distribution curve does not change remarkedly, as shown in FIG. 18. In FIG. 18, exposure intensity distribution curves in the array direction are shown, one corresponding to a compensation value m, and the other corresponding to a compensation value n. Accordingly, if the exposure intensity distribution curve corresponding to one compensation value is obtained, an exposure intensity distribution corresponding to another compensation value, and thence, a property value, can be calculated (step S12). From results of the above-described operations, the correlations of the compensation value vs. the property value, such as shown by FIG. 19, are obtained (step S13). As described, this method requires only one measurement corresponding to a compensation value.

Further, in order to obtain a predefined property value concerning the exposure intensity distribution, corresponding to a compensation value, a 2-dimensional intensity distribution is measured by assigning two compensation values, like in Example 1. Since the light volume increases or decreases according to increase or decrease, respectively, in the driving current almost in proportion, a 2-dimensional intensity distribution of another compensation value can be calculated from the 2-dimensional intensity distribution of the two compensation values (i.e., two levels of the driving current). Accordingly, a property value concerning the exposure intensity distribution can be calculated, and a correlation curve of the compensation value vs. the property value can be generated from the result. In the method described above, measuring the constant of proportion (driving current vs. light volume) is not necessary. Based on the correlation curve obtained as mentioned above, property values of a plurality of light emitting devices corresponding to the entire effective image domain are calculated, the property values falling within a predetermined range; and the compensation value and the light volume of the light emitting devices can be calculated (step S14 and step S15). The operating process after this is performed like the method shown in Example 1.

According to this method, since the property values corresponding to all the compensation values can be obtained from the exposure intensity distribution, a highly precise correlation curve is acquired.

Figure 20:
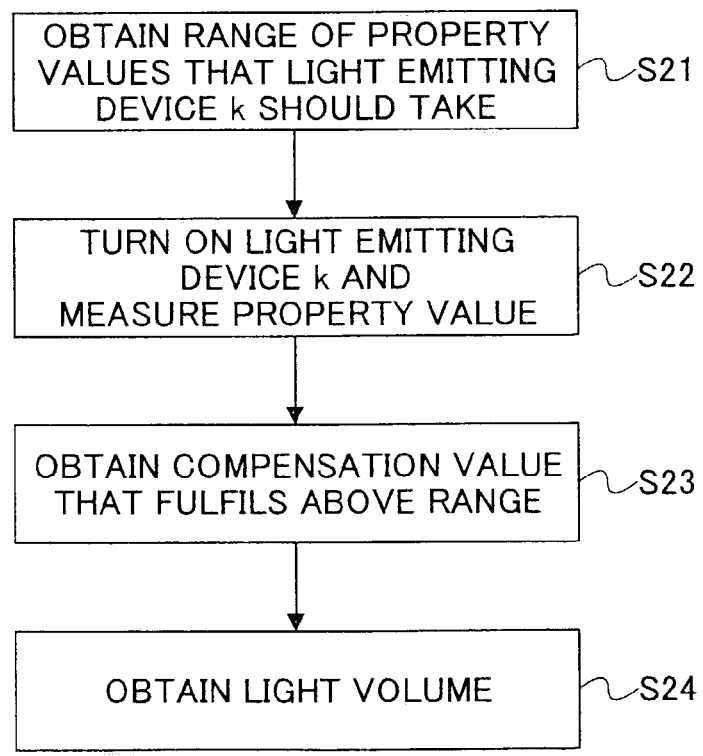
FIG. 20 is a flowchart explaining another (third) process for controlling the light volume of the light emitting devices of the adjacent light emitting device array chips used in the optical writing unit of the present invention.

Next, Example 3 of the operating process is explained with reference to a flowchart in FIG. 20. Here, compensation values are determined one by one, rather than all in one shot, without measuring property values corresponding to compensation values. Here, it is assumed that compensation values of the first through (k−1)th light emitting devices have already been determined. Next, a range of a property value that a light emitting device k can take is determined based on (s−1) property values of light emitting devices (k−s+1) through (k−1), such that s property values of light emitting devices (k−s+1) through k fall within the predetermined range (step S21). Then, the light emitting device k is energized (turned on) to emit a light, a property value corresponding to a compensation value is measured (step S22), and a compensation value that provides a property value that falls within the predetermined range is obtained (step S23).

When a plurality of compensation values provide property values that fall within the predetermined range, a compensation value that is the most desirable can be chosen. By repeating this operation successively, compensation values are determined for the entire effective image domain, and a light volume of all the emitting devices can be calculated based on the compensation values (step S24). Details follow. For facilitating the following explanation, the case wherein property values of a plurality of light emitting devices are represented by the gradient of a linear regression (approximated straight line) using the least squares approximation of the property values of three light emitting devices i, j, and k. Here, it is considered that the compensation values of the two light emitting devices i and j are already determined, providing property values Pi and Pj, respectively. Next, a range delimited by PL and PH, within which the property value of the light emitting device k should fall is determined by defining two straight lines, one having gradient HL, and the other having gradient HH, corresponding to the three light emitting devices, where HL and HH define a predetermined range for the gradient of the approximated line to take.

Figure 21:
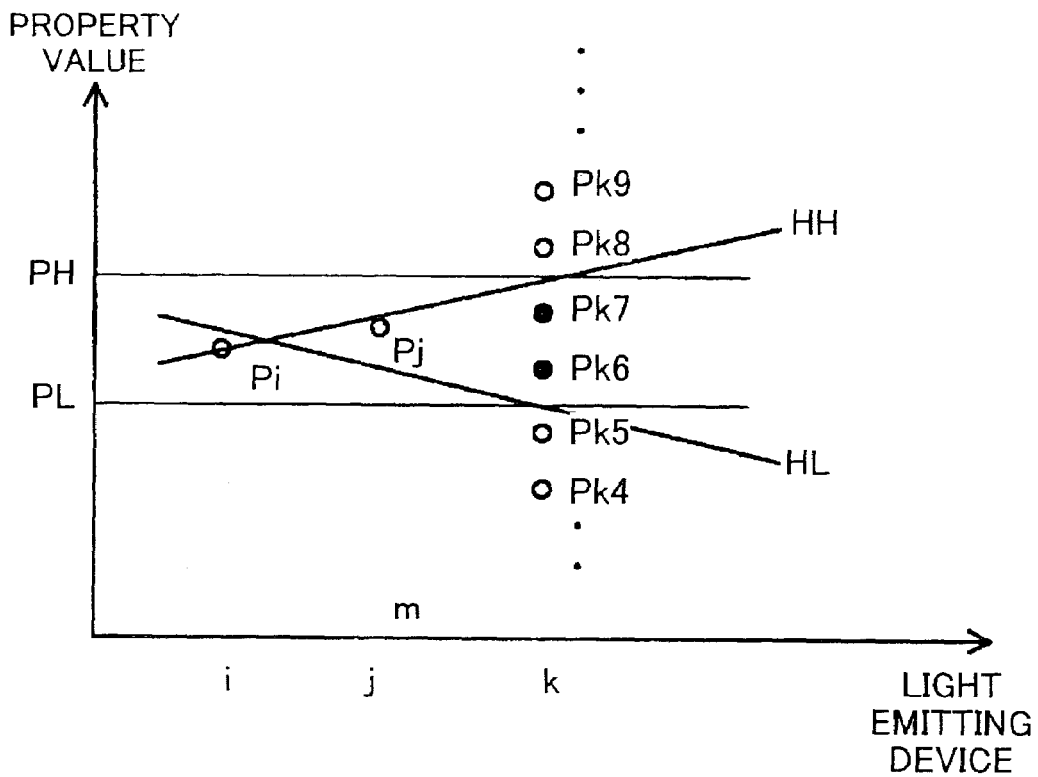
FIG. 21 is a diagram for explaining how a compensation value that provides a property value within a predetermined range, i.e., between PL and PH, is selected, the PL and PH being determined by least square approximated lines HH and HL, respectively.

Then, the light emitting device k is energized to emit a light with a compensation value, a property value corresponding to the compensation value is measured, and a compensation value that provides a property value falling within the range between PL and PH is obtained (refer to FIG. 21). In the case shown by FIG. 21, compensation values Pk6 and Pk7 meet the criteria. When there are multiple compensation values meeting the criteria, one is selected. Criteria of the selection include that a compensation value that provides the gradient closest to zero is selected; and that a compensation value that provides the gradient closest to the gradient of the approximated line of the light emitting devices (i−1), i and j is selected. By repeating this operation successively, compensation values are determined for the entire effective image domain. In addition, the compensation values of the light emitting devices up to (s−1) are determined separately from the above-mentioned method. Specifically, the compensation value of the second light emitting device is determined based on the property value of the first light emitting device, the compensation value of the third light emitting device is determined based on the property values of the first and the second light emitting devices, and the compensation value of the light emitting device (s−1) is determined based on the property values of all the preceding light emitting devices, namely, from 1 through (s−2).

According to this method, where the compensation values are determined one by one from the first to the last light emitting devices, it is conceivable that the compensation value of a light emitting device that is located in a later position may take an inappropriate value. In order to cope with this potential problem, an additional process can be provided, whereby a range of the property value Pk of the light emitting device k is defined, for example, as $0.8 \times P1 \leq Pk \leq 1.2 \times P1$, where P1 represents the property value of the first light emitting diode.

In the above-described Examples, the driving current is controlled by the compensation value such that the light volume is adjusted. The light volume can also be controlled by adjusting the illuminating period by the compensation value. It is also possible to combine the driving current and the illuminating period for adjusting the light volume. The compensation values, which control the light volume of each emitting device, may be stored in ROM inside an optical writing unit, and may be stored in ROM prepared outside of the optical writing unit, for example, in an image forming apparatus. If ROM is provided in the optical writing unit, the light volume of the light emitting device array is controlled based on the compensation value.

On the other hand, if ROM is provided outside of the optical writing unit, the light volume of the light emitting device array is controlled by the compensation value provided from the outside. When the compensation value is stored in ROM inside the optical writing unit, it is desirable to control the driving current by the compensation value. At this time, an output image signal sent to the optical writing unit can be obtained by controlling the illuminating period based on an image processing performed to an input image signal.

Figure 22:
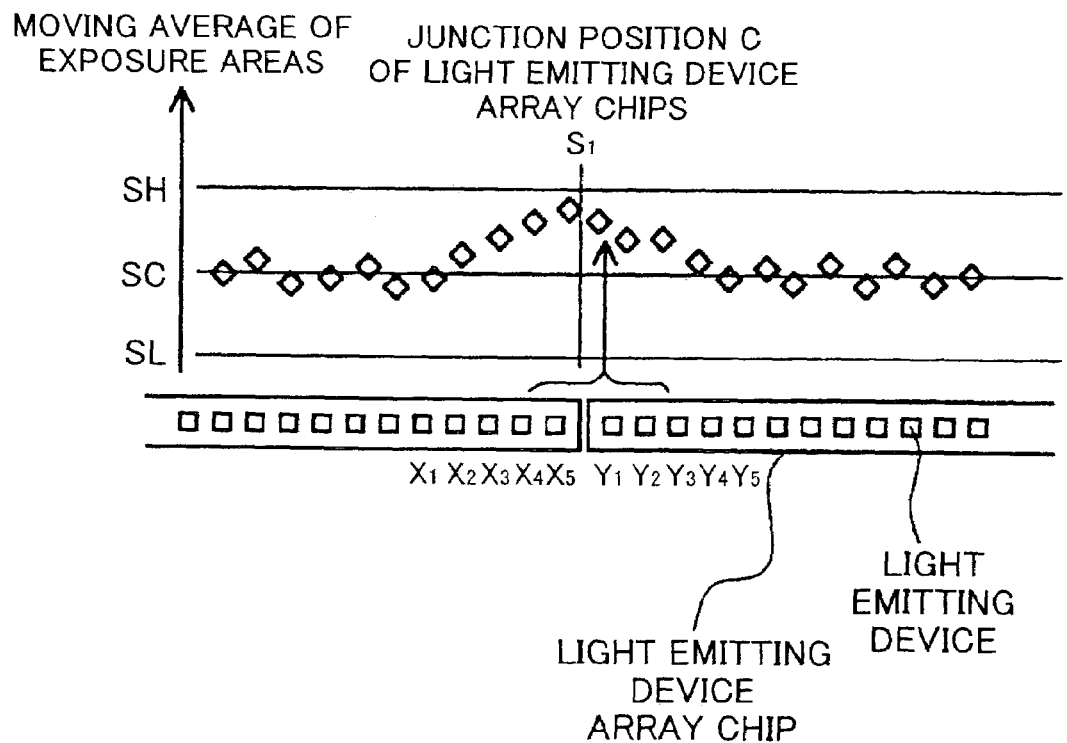
FIG. 22 is for explaining how a moving average of a target light emitting device is obtained, the moving average being an average of the exposure areas of a predetermined number of light emitting devices around the target light emitting device.

The embodiment of the present invention is further explained with reference to FIG. 22, which shows the case wherein the moving average of the exposure areas of N light emitting devices is used for examining the property values of the light emitting devices. Here, N is set at 5, that is, the moving average of the property values of the exposure areas of five light emitting devices near the edges of light emitting device array chips is considered. A moving average S1 is an average property value of the exposure areas of five light emitting devices, namely, X4, X5, Y1, Y2, and Y3.

In other words, in order to determine the moving average S1, the exposure areas of the five light emitting devices X4, X5, Y1, Y2, and Y3 are needed. Therefore, at least three exposure area values of the light emitting devices near the edge of each light emitting device array chip are required (N/2 or more). Namely, by setting up the light volume for the light emitting devices X3, X4, and X5 and the light emitting devices Y1, Y2, and Y3, the moving average of the light emitting devices near the edges of the light emitting device array chips can be efficiently set at a target value. Further, as an upper limit of the number of light emitting devices near the edge of a light emitting device array chip, if the contribution to the variation of the moving average of the light emitting devices near the edge of the light emitting device array chip is taken into consideration, N=5 pieces are sufficient.

The embodiment of the present invention is further explained with reference to FIG. 23, which shows the structure of the image forming apparatus according to the embodiment of the present invention. As for the image forming apparatus, an image is formed by an image forming process such as an electrophotography process.

An outline of the electrophotography process is described. An electric charge is provided to an image supporting object 11 (for example, a photo conductor) by an electrification unit 12 (electrification process). A latent image is generated by irradiating an optical spot from an optical writing unit 13 (exposure unit) on the image supporting object 11 (exposure process). The latent image is developed by a development unit 14 that causes toner to adhere to the latent image, and a toner image is generated (development process). The toner image is transferred to a recording paper 15 by an imprint unit 16 (imprint process), and pressure and heat are applied to the recording paper 15 by a fixing unit 17 such that the transferred image is fixed (fixing process). In addition, toner that remains on the image supporting object 11 is cleaned by a cleaner unit 18, and the electric charge is discharged by an electric discharging unit 19. In this manner, the process cycle from charging to discharging is formed. Here, the optical writing unit of the present invention is applicable to the image forming apparatus according to the embodiment of the present invention.

Figure 24:
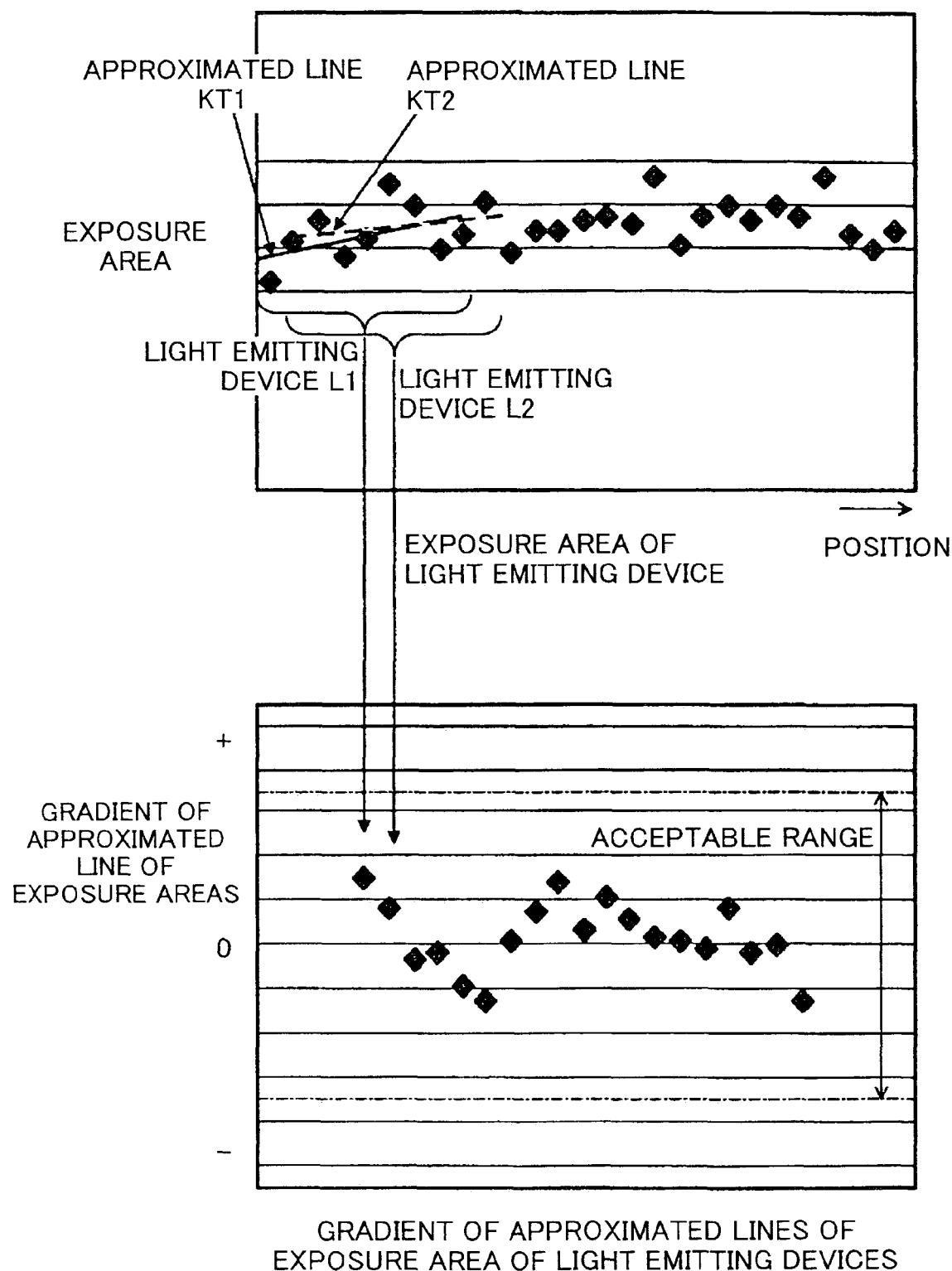
FIG. 24 shows two graphs, the top graph showing relations between positions of light emitting devices and exposure areas, and the bottom graph showing gradient values of the approximated (regressed) lines of the exposure areas for the light emitting devices.

Another embodiment of the present invention is explained. The optical writing unit that consists of a light emitting device array constituted by a plurality of light emitting device array chips, each of which consists of a plurality of light emitting devices, is characterized by setting up the light volume of the plurality of light emitting devices that are selected at a predetermined cycle, such that the gradient of an approximated line (regressed line) of the exposure areas fall within a predetermined range for the entire effective image domain. Details follow. First, the principle is explained in the case that the cycle is such that a light emitting device is selected, then the next two light emitting devices are not selected, i.e., 1 on-2 off, which is repeated as the cycle. Here, the exposure area can be defined as the cross-sectional area at a certain threshold level in the exposure intensity distribution curve of the optical spot corresponding to a certain light emitting device, as shown in FIG. 7. FIG. 24 provides two graphs that are inter-related, wherein the top graph shows relations between the position of each light emitting device and the exposure area, and the bottom graph shows gradients of approximated (regressed) lines of the exposure areas corresponding to the plurality of light emitting devices. Then, the exposure areas corresponding to the plurality of light emitting devices are plotted, and the approximated straight lines are obtained as shown in the top graph of FIG. 24. The gradient of each approximated straight line is plotted as shown in the bottom graph of FIG. 24. The approximated straight lines can be obtained by the least squares method, for example.

Figure 25:
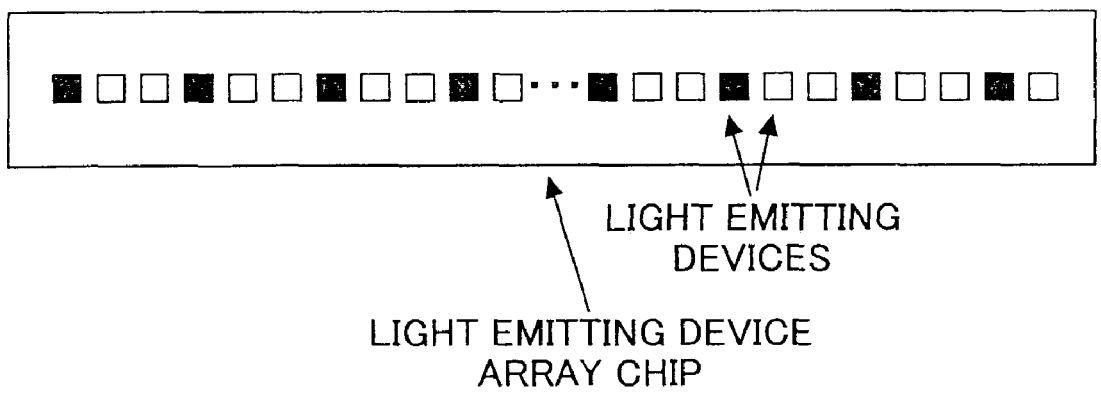
FIG. 25 is for explaining how a light emitting device is selected at an equal interval, where an example of selecting one every third light emitting device is shown.

Here, in reference to the top graph of FIG. 24, the horizontal axis represents positions of the light emitting devices that are selected and property values measured (plotted at equal intervals where every third light emitting device is selected). In the example shown in FIG. 24, gradients of approximated lines (KT1, KT2 - - - ) are drawn one by one corresponding to nine light emitting devices (L1, L2 - - - ), respectively; and the gradients fall within the predetermined range ("Acceptable Range" shown in the bottom graph of FIG. 24) in the entire effective image domain. The predetermined range is determined according to properties of an image forming apparatus, etc., and set up so that the vertical stripe due to concentration unevenness is made inconspicuous. The above measurement results of the exposure areas shown in FIG. 24 are obtained not from all the light emitting devices, but from the light emitting devices chosen at equal intervals. Here, the equal intervals are made of one out of every three light emitting devices, as shown in FIG. 25. In this manner, the gradients of the approximated lines of a predefined property value (here, the exposure area) concerning the exposure intensity distribution corresponding to the plurality of light emitting devices are settled within the predetermined range for the entire effective image domain.

Furthermore, in the present embodiment, the light volume of the light emitting device near the edge of a light emitting device array chip is set up based on the light emitting device interval across the edges of adjacent light emitting device array chips. Hereafter, the principle is explained. It is desirable that the plurality of light emitting devices be positioned at an equal predetermined interval P. Within a light emitting device array chip, this is practically achieved. However, since light emitting device array chips are not mounted on a substrate with sufficient accuracy, the interval Pa between a light emitting device on an edge of a light emitting device array chip and another light emitting device on an adjacent edge of the next light emitting device array chip often differs from P (Cf. FIGS. 1 through 3). In the case of FIG. 1, it is Pa>P.

When the difference (Pa−P) is present at, the light emitting device interval of the adjacent light emitting devices of the adjacent light emitting array chips, an image output from an image forming apparatus equipped with an optical writing unit with this light emitting device array and an image forming device array shows a black vertical line and a white vertical line, and image quality is degraded. To avoid this, according to the embodiment of the present invention, the light volume of the light emitting devices on and near the edges of adjacent light emitting device array chips is set up according to the gradient of an approximated line of the exposure areas of the plurality of light emitting devices corresponding to the interval between the light emitting devices at the edges of adjacent light emitting device array chips.

Figure 26:
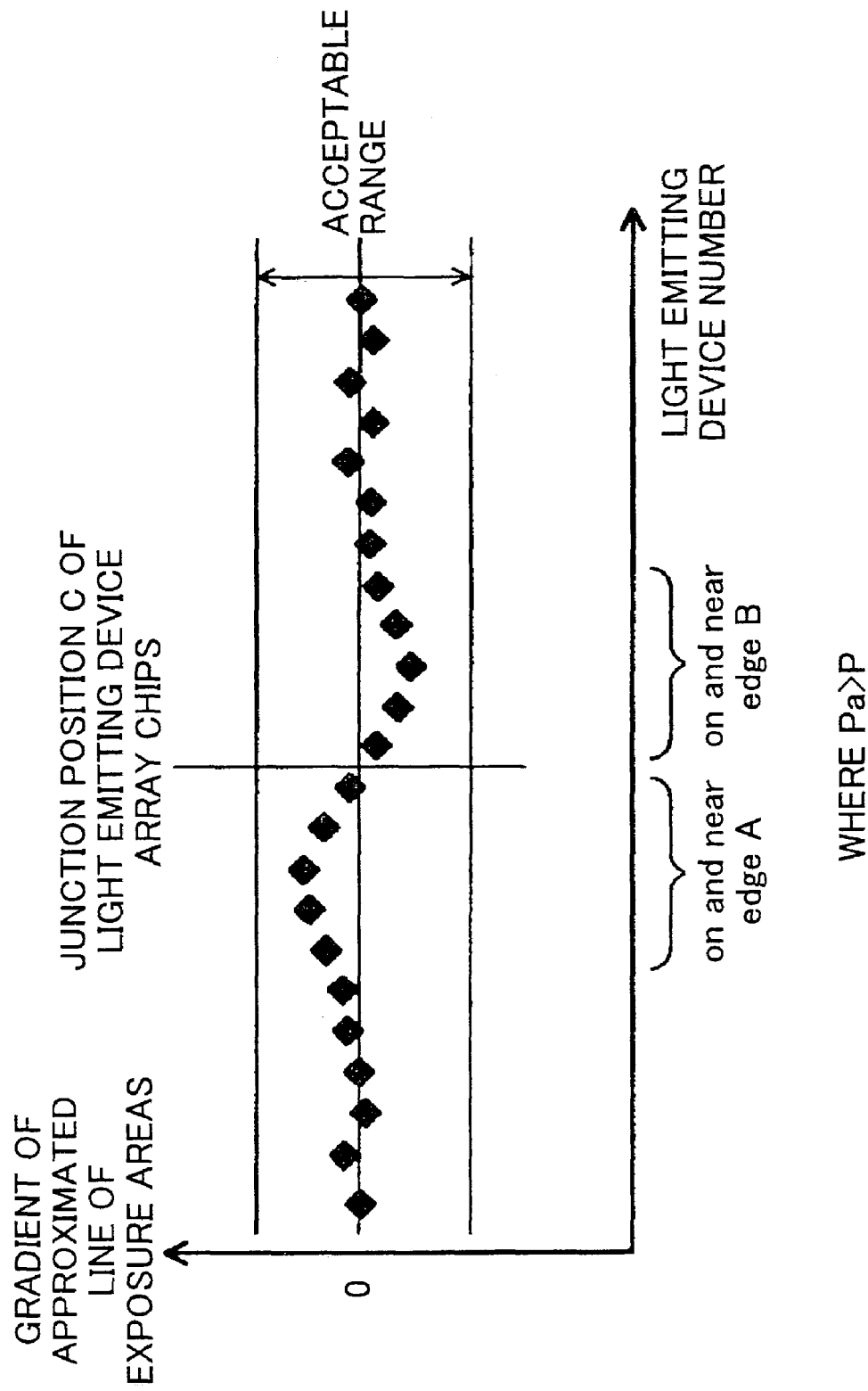
FIG. 26 shows the gradient values of the approximated lines of exposure areas of the light emitting devices near the edge of a light emitting device array chip, where Pa>P.
Figure 27:
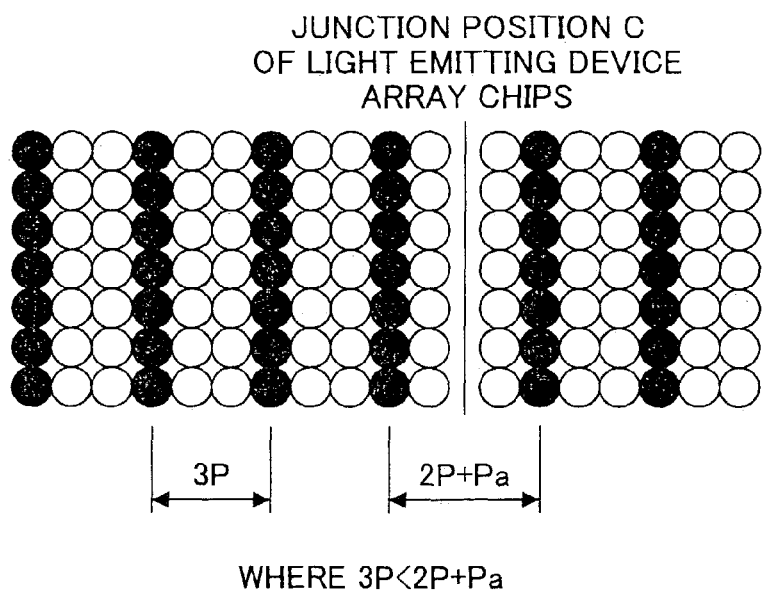
FIG. 27 is a schematic diagram showing a junction of light emitting device array chips, which generates an undesirable vertical stripe, because Pa>P, on a printed image corresponding to the junction.

The principle is further explained using FIG. 26. In the case of Pa>P, as shown in FIG. 1, the light emitting device interval Pa across the edges of light emitting device array chip is greater than the predetermined interval P. Therefore, when an image is output by an image forming apparatus using an optical writing unit equipped with this light emitting device array and an image forming device, a white vertical line is often generated on the image. For example, FIG. 27 shows a schematic diagram of image dots (image pattern) generated by two light emitting device array chips near the junction position of the two light emitting array chips, the image pattern being a vertical line in parallel with the moving direction of an image supporting object (photo conductor). Here, every third light emitting device is energized, i.e., 1 on-2 off. The interval of the vertical lines generated by the light emitting devices arranged in the predetermined interval P is generally 3P, neglecting variances possibly arising out of the image forming apparatus and the image formatting element array, which are negligible in fact. Conversely, the interval between two vertical lines across the junction of the two light emitting device array chips is 2P+Pa. Since 3P<2P+Pa, a white vertical line becomes more conspicuous at the junction, as Pa becomes greater. Accordingly, in order to make the white vertical line inconspicuous, the light volume of the light emitting devices on and near the edges of the light emitting device array chips is set up so that the gradient of the approximated line of the exposure areas falls within the acceptable range as shown in FIG. 26.

A further explanation follows. The light emitting devices located near the edge A shown in FIG. 26 have a value of gradient that is not negative; the light emitting devices located near the edge B shown in FIG. 26 have a value of gradient that is not positive; and the value of gradient at the junction of the two edges is approximately zero. In other words, the exposure area corresponding to the light emitting devices near the edge A is increased as the light emitting device number is increased (from left to right); and the exposure area corresponding to the light emitting devices near the edge B is decreased as the light emitting device number is increased (from left to right). By using the optical writing unit that employs the light emitting device array, the light volume of which is controlled according to this principle, the white vertical stripe generated conventionally can be made inconspicuous.

In this manner, the light volume of the light emitting device that is turned on, in this first process, is determined. The light volume of the light emitting devices that are turned off, in the first process, is yet to be determined. Then, the image pattern is shifted by one light emitting device such that the light volume of the next (i.e. the second) light emitting device can be determined. Then, the image pattern is further shifted by one light emitting device such that the light volume of the next (i.e., the third) light emitting device can be determined.

Alternatively, a simplified method is that the light volume of the two light emitting devices that are not turned on in the first process is set at the same light volume as the light emitting device that is turned on in the first process.

Further alternatively, a combination of the two abovementioned methods is also possible. For example, to the light emitting devices near the edge of the light emitting device array chip, the former method (shifting the 1 on-2 off pattern) is used, and to the light emitting devices that are not located near the edge of the light emitting device array chip, the latter method is used.

Generally, according to the embodiment of the present invention, an appropriate method can be chosen based on characteristics of the light emitting device array and the image forming device array.

In the following, measurement of the interval Pa between light emitting devices on the edges of light emitting device array chips is explained. The interval Pa between neighboring light emitting devices across the neighboring edges can be directly measured by monitoring the interval between the light emitting devices on the edges using a known 2-dimensional CCD, etc. Alternatively, an interval between optical spots (e.g., an interval between gravity centers of the optical spots) can be measured, and made to represent Pa, the optical spots being generated by an optical writing unit consisting of the light emitting device array and the image forming element array, wherein the light emitting devices on the edges are energized (turned on).

Since an exposure intensity distribution is measured when obtaining the exposure area, it is possible to also obtain the interval between the optical spots at the same time. Further, the exposure area can be obtained without measuring the exposure intensity distribution. Specifically, exposure widths of two cross sections, intersecting each other perpendicularly maybe obtained by a slit, and so on. Then, the obtained exposure widths are converted to the exposure area. In this case, the interval between center-of-gravity positions of the cross-section intensity distributions in the direction of the light emitting device array, which is obtained from the transmitted light through the slit, can serve as the optical spot interval.

Figure 28:
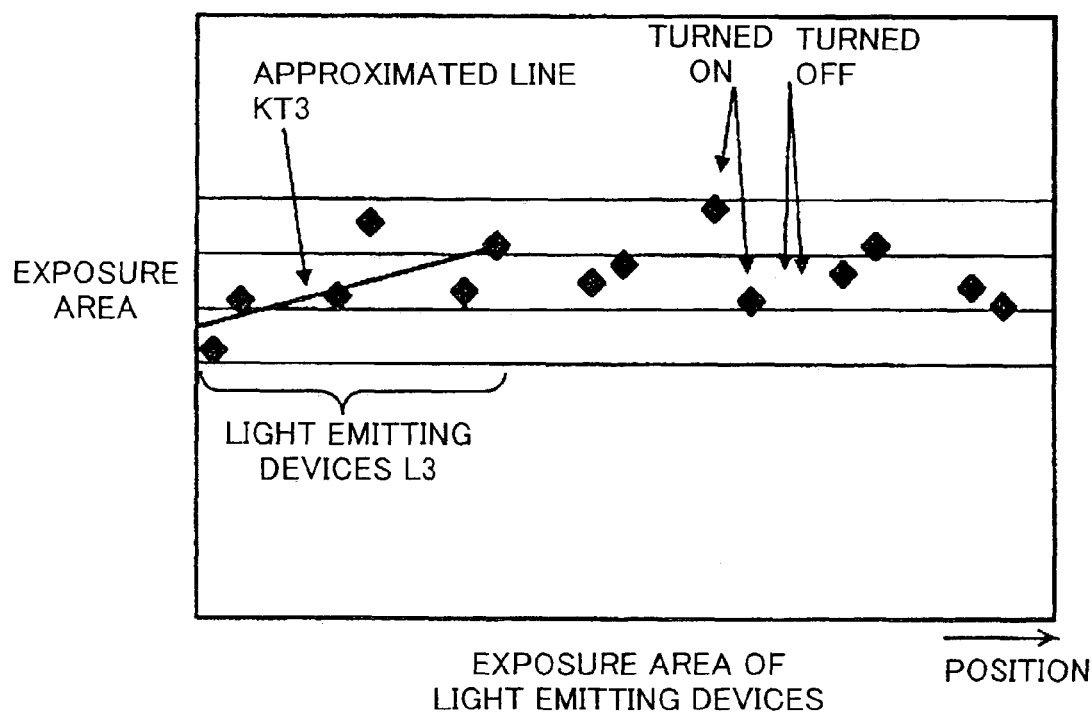

The predetermined cycle for selecting light emitting devices that are to be measured may be an equal cycle. Specifically, in the previous embodiment, the cycle of ON:OFF is set at 1:2. The cycle may be 2:2, that is, 2 on-2 off. In this case, the gradient of the approximated line looks like as shown in FIG. 28.

The predetermined cycle for selecting light emitting devices that are to be measured may be an equal cycle, wherein M light emitting devices are turned on, and N light emitting devices are turned off; and M<=N. In the case of 1 on-2 off, M=1 and N=2. A ratio of the number of the light emitting devices that are turned on to the total number of the light emitting devices is expressed by M/(M+N). The ratio is ⅓ in the case of 1 on-2 off, indicating that the measurement time and operating time are shortened. Thus, the effect of shortening becomes greater as N is increased. However, the N should not be too large, and in the case of a light emitting device array of 600 dpi, N=2 is desired; and in the case of the light emitting device array of and 1200 dpi, N=3 or 4 is desired.

Next, the embodiment of the present invention is further explained. According to the embodiment of the present invention, the interval (pitch) of the light emitting devices is set at ¹⁄₁₀ or less of the interval (pitch) of image forming devices. Hereafter, the principle is explained. Generally, it is desired that the pitch of the light emitting devices be sufficiently small (¹⁄₁₀ or less) compared with the pitch LK of the image forming devices. In this manner, the flux of light emitted by adjacent light emitting devices can take almost the same optical path to an image forming device, alleviating undesired influence, such as aberration, and producing little variation in each optical spot.

Figure 29A:
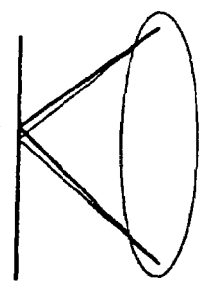
FIG. 29 shows incident rays to an image forming device array, the top view A showing the case where a pitch of the light emitting devices is sufficiently small, and the bottom view B showing the case where the pitch of the light emitting devices is not sufficiently small.
Figure 29B:
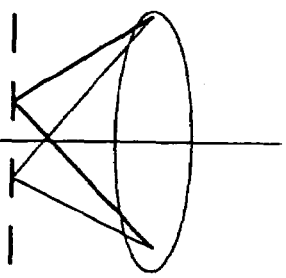

This matter is further explained with reference to FIG. 29, which is a simplified diagram showing an image of one image forming device among image forming devices. The top part (A) of FIG. 29 shows the case, where the pitch of the light emitting devices is set sufficiently small (¹⁄₁₀ or less), compared with the pitch LK of the image forming devices, where the incident angle of the light from each of the adjacent light emitting devices to the image forming device is almost equal, forming the almost same optical spot. In contrast, the bottom part (B) of FIG. 29 shows the case, where the pitch of the light emitting devices is not small enough, compared with the pitch LK of the image forming devices, and incidence from one of the adjacent light emitting devices to the image forming device differs from another adjacent light emitting device, producing a different shape of the optical spot corresponding to each light emitting device. Especially, in the case that image-formation properties of the image forming devices of an image forming device array vary greatly from device to device, change of the shape of the optical spot tends to be buried in the evaluation width (distance equivalent to a plurality of light emitting devices, as mentioned above), and it is more desirable that the pitch of the light emitting devices be sufficiently smaller than the pitch of the image forming devices.

Here, the evaluation width is a width defined by a number of light emitting devices required for deriving the gradient of the approximated line. When the pitch of the image forming devices is set to LK (mm), the approximated straight line for the exposure areas of the light emitting devices is obtained with reference to the exposure areas of the light emitting devices that are located within a distance range between LK and 3LK. In other words, the evaluation width (width of the light emitting devices required for deriving the approximated line) ranges between LK through 3LK (mm), where LK represents the pitch of the image forming devices (mm). Hereafter, a reason for this is explained with reference to an optical writing unit shown in FIG. 30 and FIG. 32.

Figure 30:
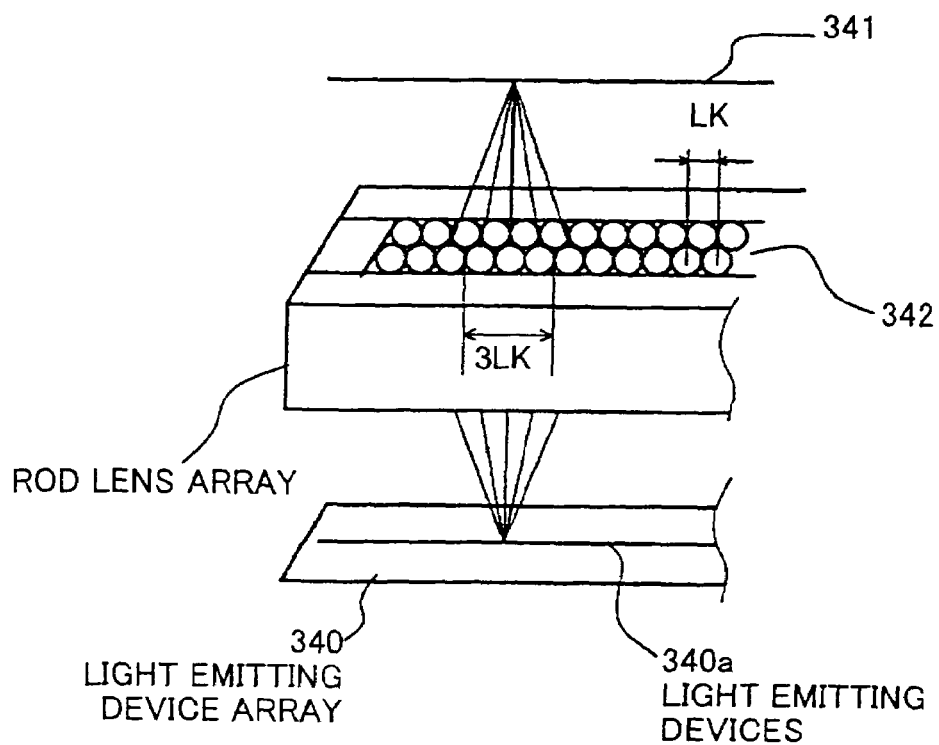
FIG. 30 shows an example of the optical writing unit including a light emitting device array, an image forming device array, and a rod lens array.
Figure 31:
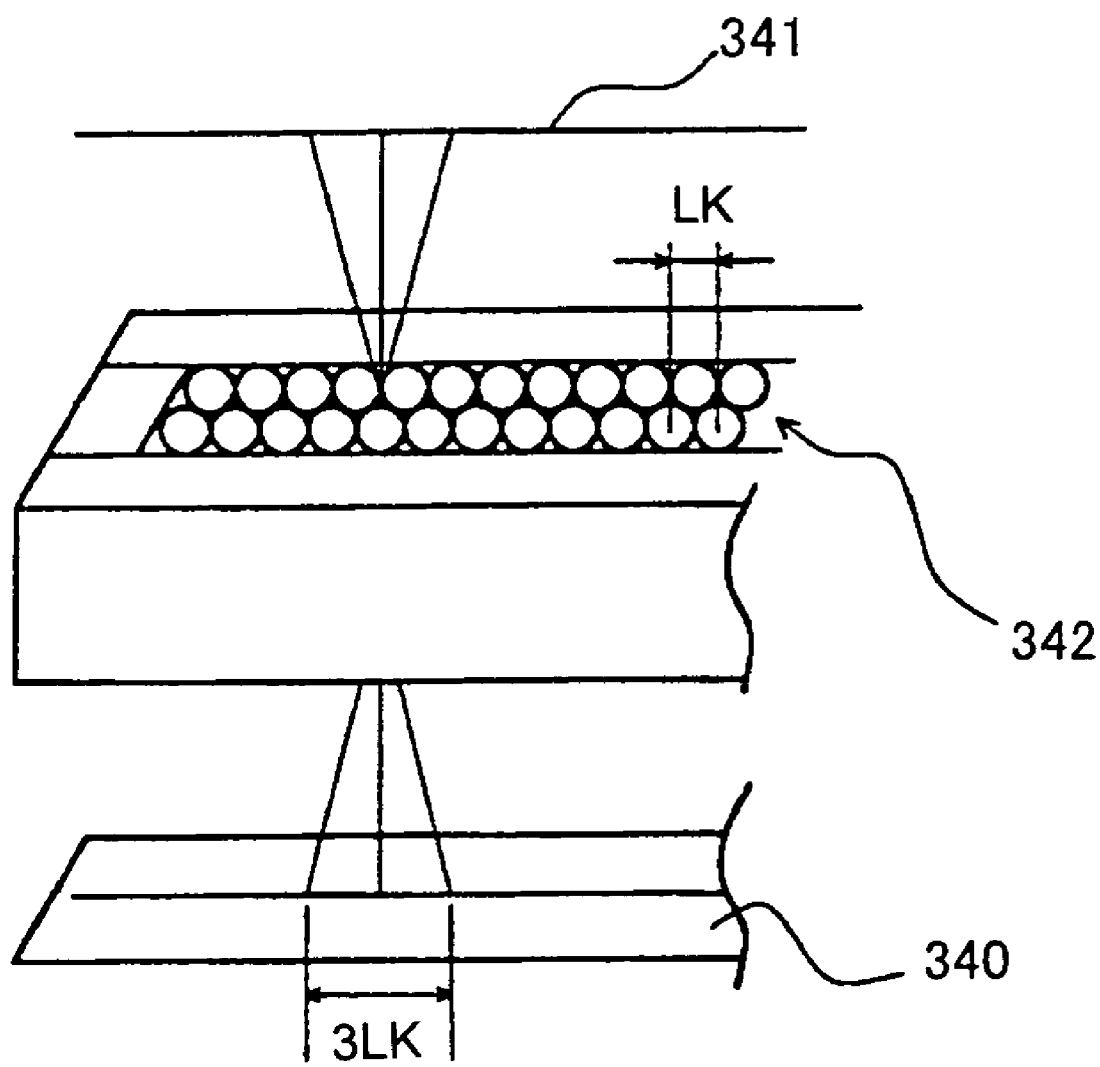
FIG. 31 shows relations between a range of the light emitting devices that one rod lens mainly covers and the pitch of the rod lenses in the optical writing unit using the rod lens array.

FIG. 30 is a diagram showing an example of the optical writing unit that includes a light emitting device array 340, an image forming device array 341, and a rod lens array 342. The light emitting device array 340 includes a plurality of light emitting devices 340a. A flux of light emitted from a light emitting device 340a forms an optical spot through a plurality of rod lenses. In this example, the pitch of the rod lens array 342 is set, at 0.6 mm. As for the light emitting device 340a, rod lenses that are located within a range of about 3 or less times of the pitch of the rod lenses highly contribute to formation of the optical spot, although the range varies depending on properties of the rod lens array 342. Further, although lights from a plurality of light emitting devices 340a pass through one rod lens in the case of this optical writing unit, the width (the number) of light emitting devices 340a that one rod lens mainly bears is about 3 or less times the pitch of the rod lenses (refer to FIG. 31). Accordingly, when a fault, due to manufacturing errors or otherwise, is present in a rod lens, the quality of the optical spots will be degraded, which correspond to the light emitting devices that use the faulty rod lens that is, the light emitting devices located in the range of LK through 3LK. For this reason, it is desirable to obtain the approximated line corresponding to a plurality of light emitting devices that are located in equivalent to the distance of LK–3LK.

Figure 32:
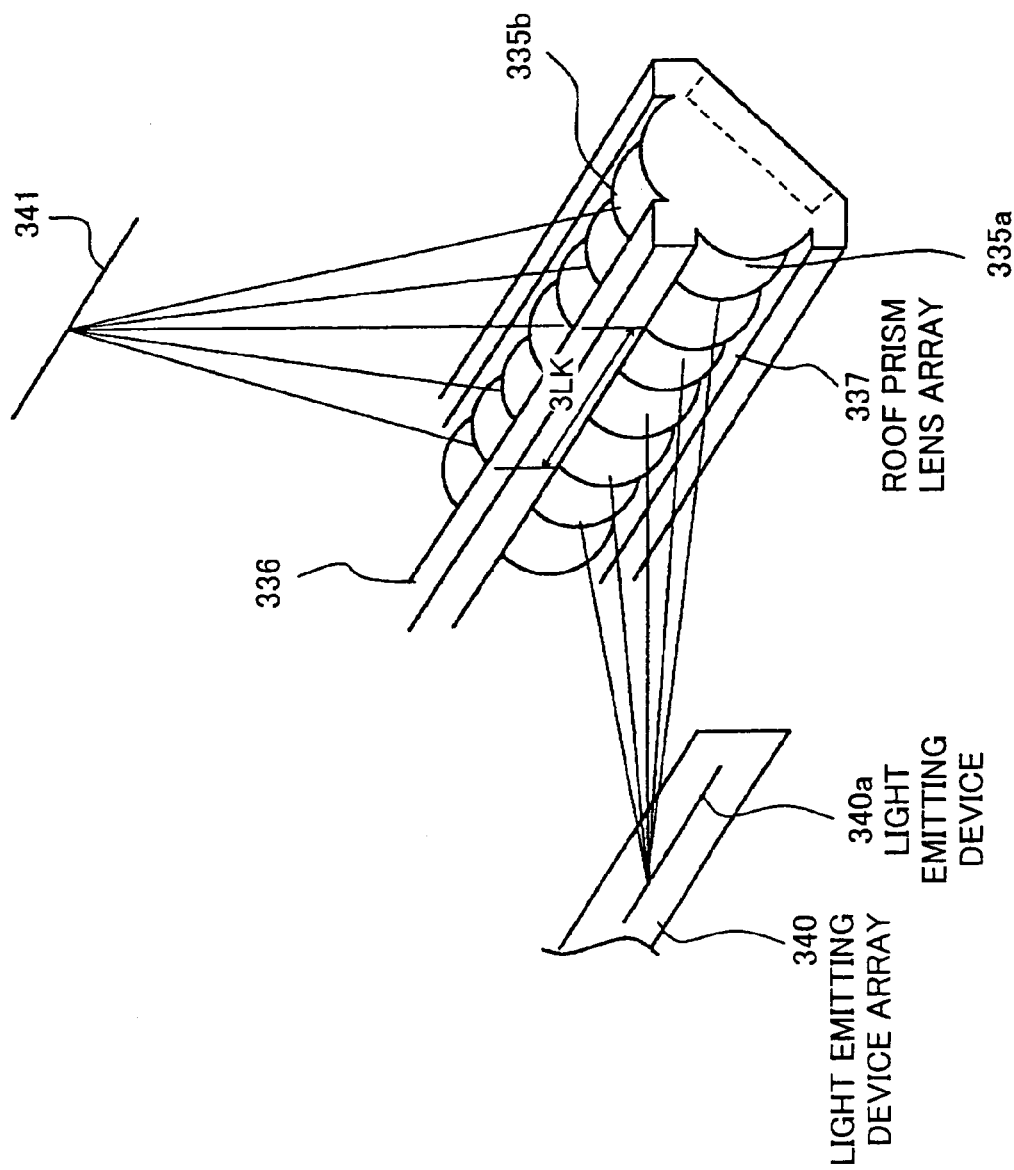
FIG. 32 shows an example of the optical writing unit including a light emitting device array, an image forming device array, and a roof prism lens array.
Figure 33:
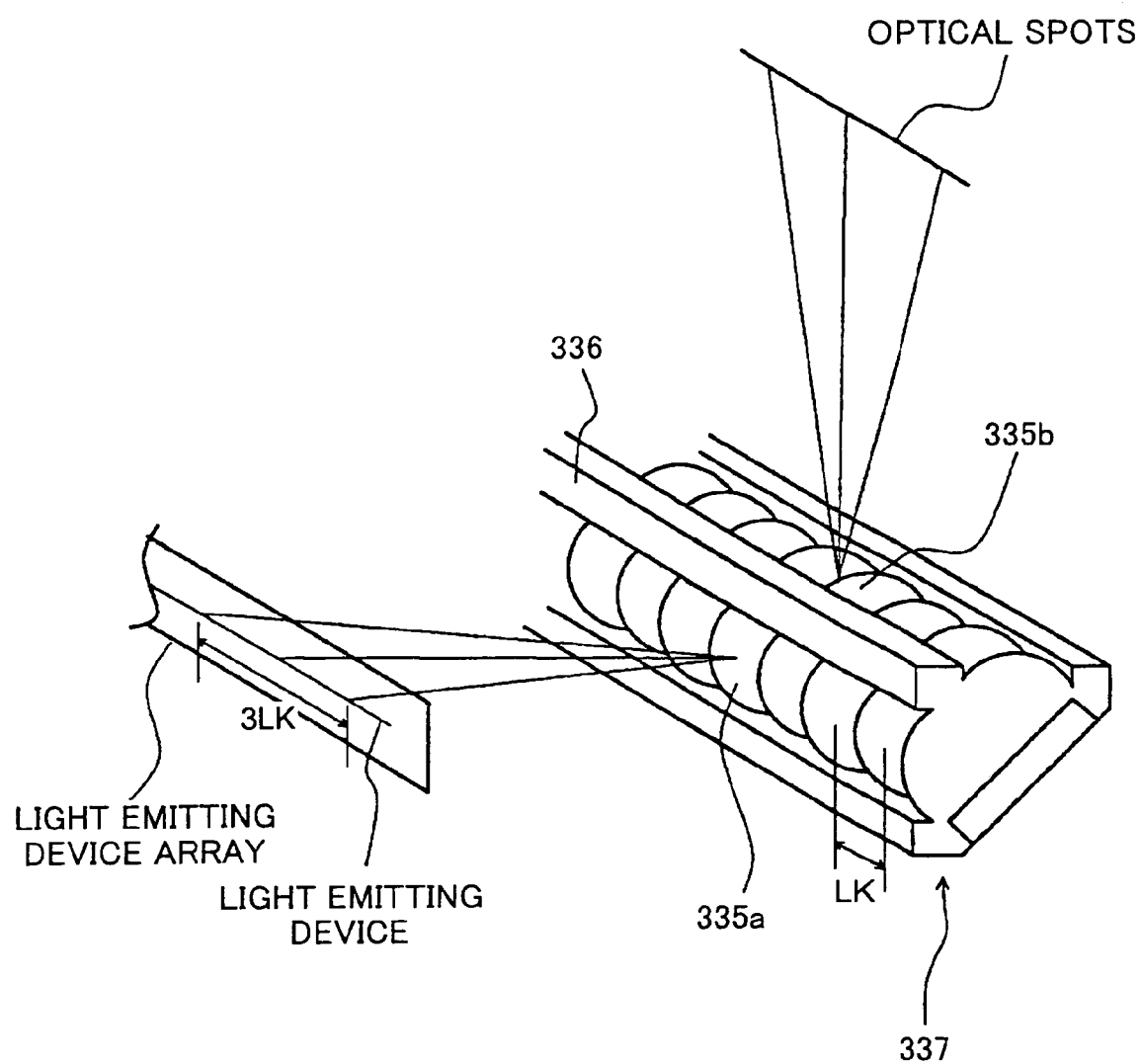
FIG. 33 shows relations between a range of the light emitting devices that one rod lens mainly covers and the pitch of the rod lens in the optical writing unit using the roof prism lens array.

Further explanation follows with reference to another example. FIG. 32 is a diagram showing another example of the optical writing unit that includes the light emitting device array 340, the image forming device array 341, and a roof prism lens array 337. The flux of light emitted from one light emitting device 340a forms an optical spot through a plurality of roof prism lenses. In this example, the pitch of the roof prism lens array 337 is set at 0.8 mm. In this case, roof prism lenses that are located within a range of about 3 or less times of the pitch of the roof prism lenses contribute to forming an optical spot of a light emitting device, although the range is dependent on properties of the roof prism lenses. Conversely, lights from a plurality of light emitting devices 340a pass through one roof prism lens, and the width (the number) of light emitting devices 340a that one roof prism lens mainly bears is about 3 or less times of the pitch of the roof prism lenses (refer to FIG. 33). Accordingly, when a fault, due to manufacturing errors or otherwise, is present in the optical properties of a certain roof prism lens, the quality of the optical spots is degraded by the faulty roof prism lens, which corresponds to light emitting devices 340a that are located equivalent to a distance of LK–3LK. Therefore, also in this case, it is desirable to obtain the approximated line corresponding to light emitting devices that are located equivalent to the distance of LK–3LK.

Next, the embodiment of the present invention is further explained. In the present embodiment, an interval Pa between a light emitting device on the edge of a light emitting device array chip and another light emitting device on the edge of the adjacent light emitting device array chip is considered, the above-mentioned two edges being adjacent. The interval is categorized into a plurality of ranks, based on the magnitude of the Pa. Then, for each rank, different light volume is set up by defining different gradients of the approximated line of the exposure areas. Details follow. An optical writing unit using this light emitting device array and an image forming device array is installed in an image forming apparatus, and an image is output, using the image forming apparatus as an exposure unit. Then, an interval of the light emitting devices that generates a black vertical line, and an interval of the light emitting devices that generates a white vertical line are determined. For example, the interval Pa that serves as a boundary of a black vertical line being generated and not generated is named PL; and the interval Pa that serves as a boundary of a white vertical line being generated and not generated is named PH.

Figure 34:
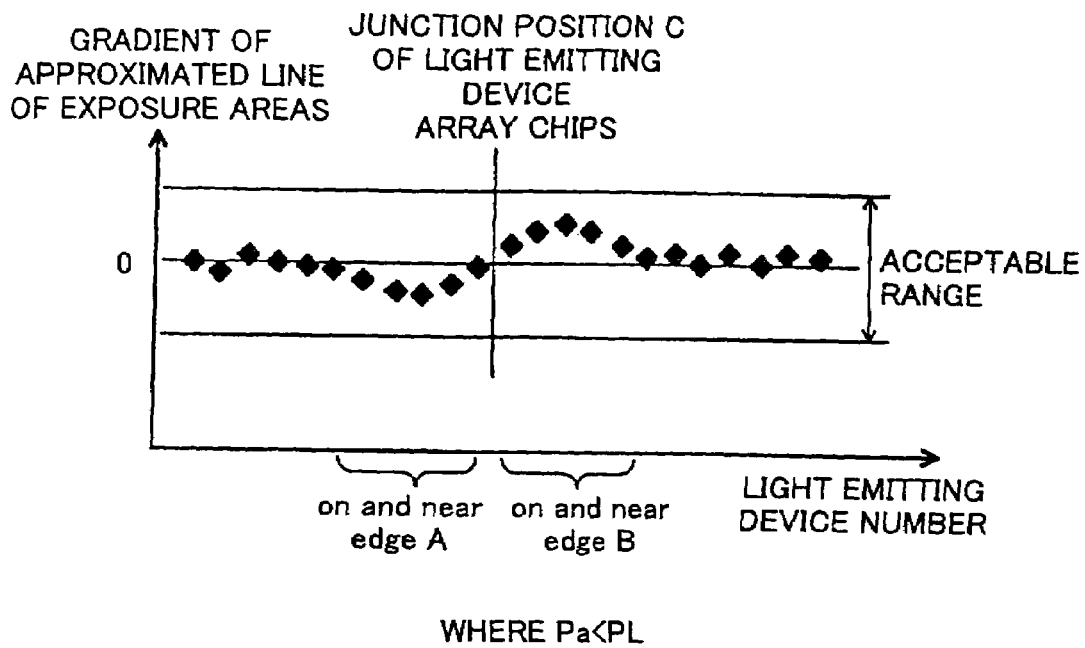
FIG. 34 is a graph showing desirable gradients of approximated lines of exposure areas of the light emitting devices, where Pa<P.
Figure 35:
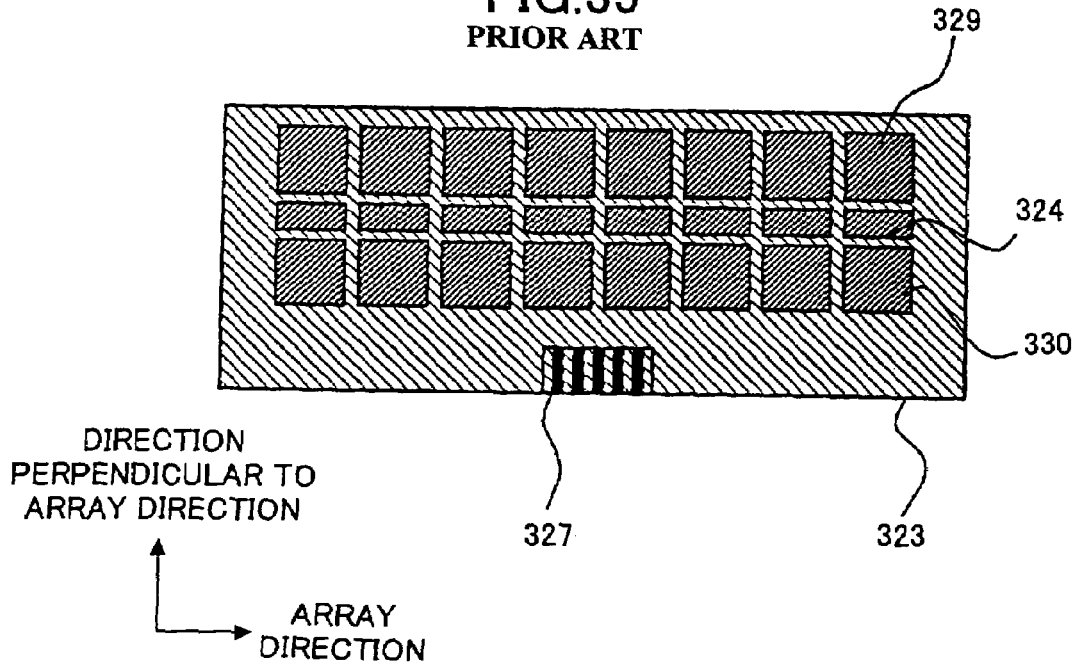
FIG. 35 is a plan view showing an outline structure of a conventional light emitting device array.
Figure 36:
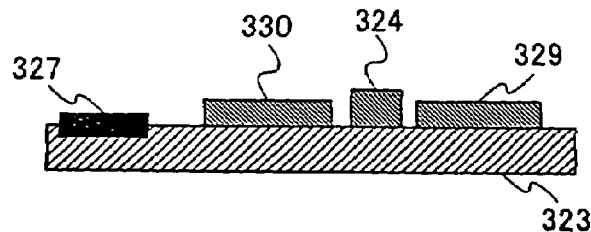
FIG. 36 shows a cross-sectional view of FIG. 35.
Figure 37:
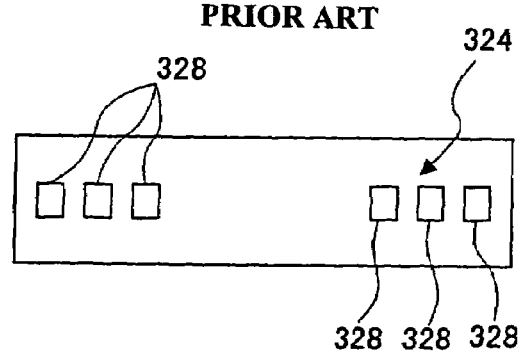
FIG. 37 is a plan view of a light emitting device array chip in the light emitting device array shown in FIG. 35.
Figure 38:
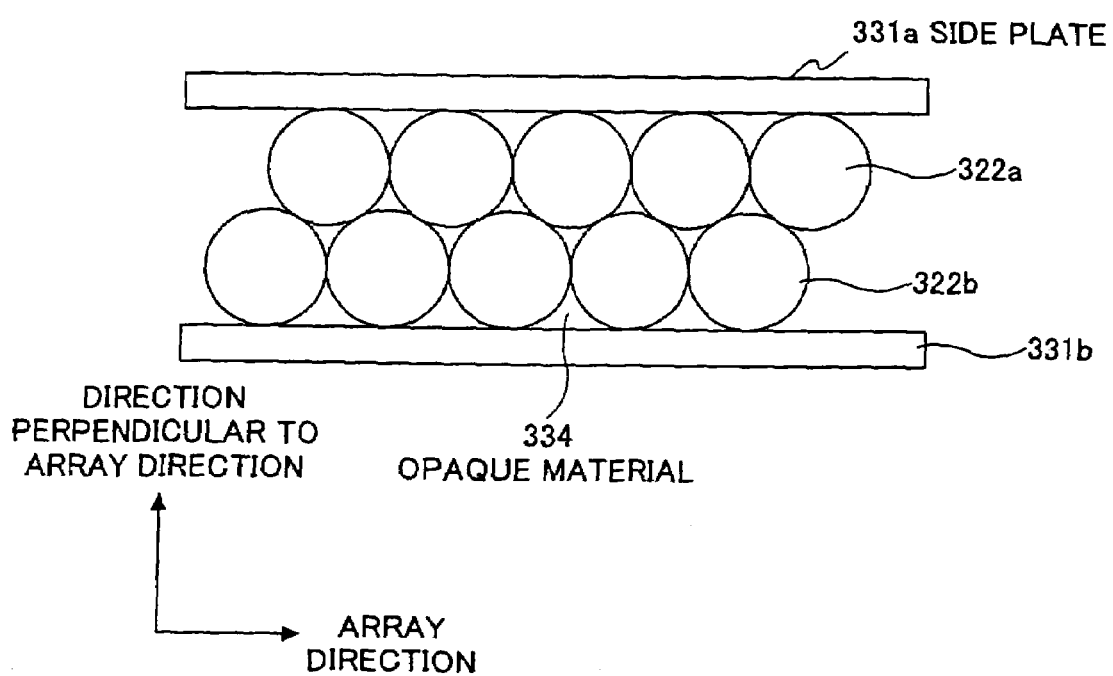
FIG. 38 is a cross-sectional drawing showing the outline structure of an image forming device array constituted by a rod lens array, which is used by a conventional optical writing unit employing a solid-state optical writing unit method.
Figure 39:
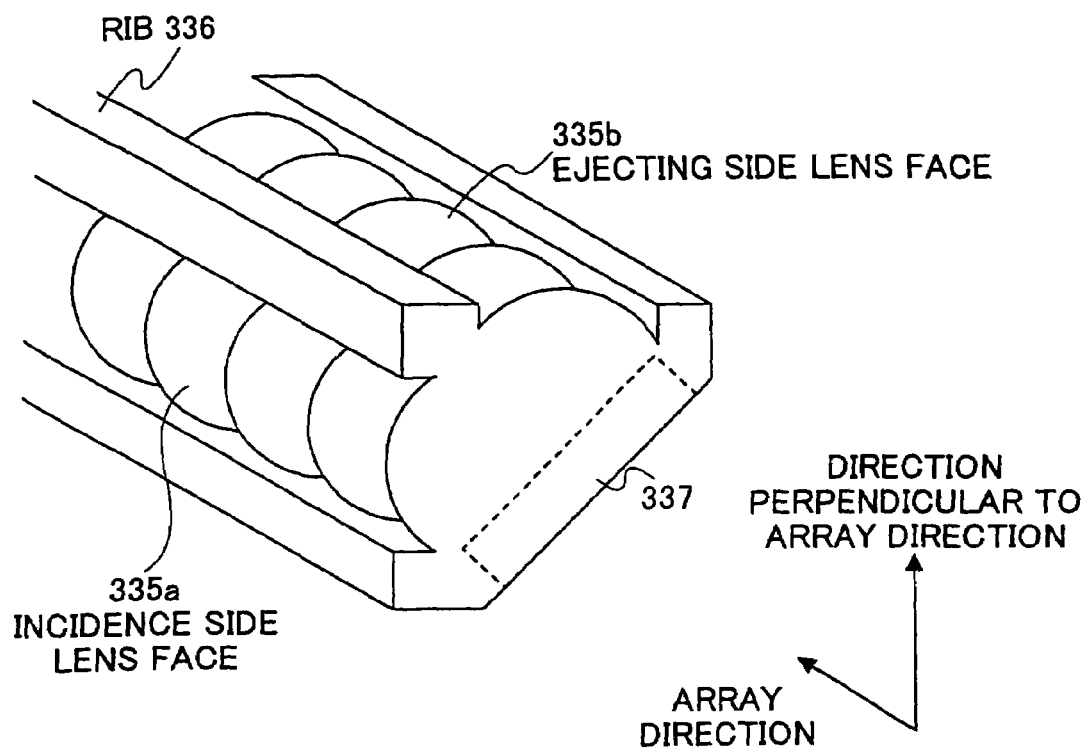
FIG. 39 is a perspective diagram showing the structure of the image forming device array constituted by a roof prism lens array, which is used by a conventional optical writing unit using a solid-state optical writing method.
Figure 40:
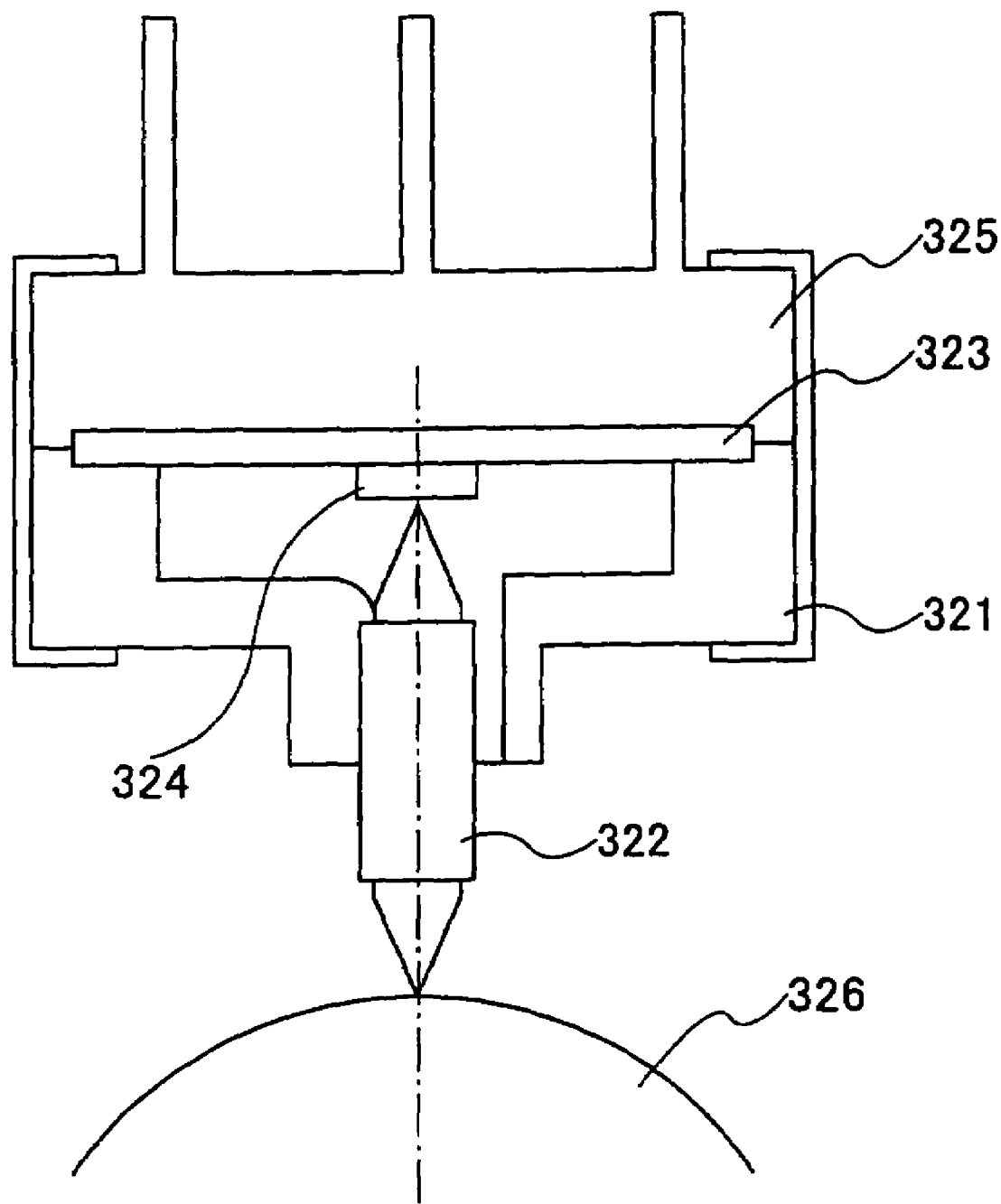
FIG. 40 is a cross-sectional diagram showing the structure of a conventional optical writing unit using the rod lens array.
Figure 41:
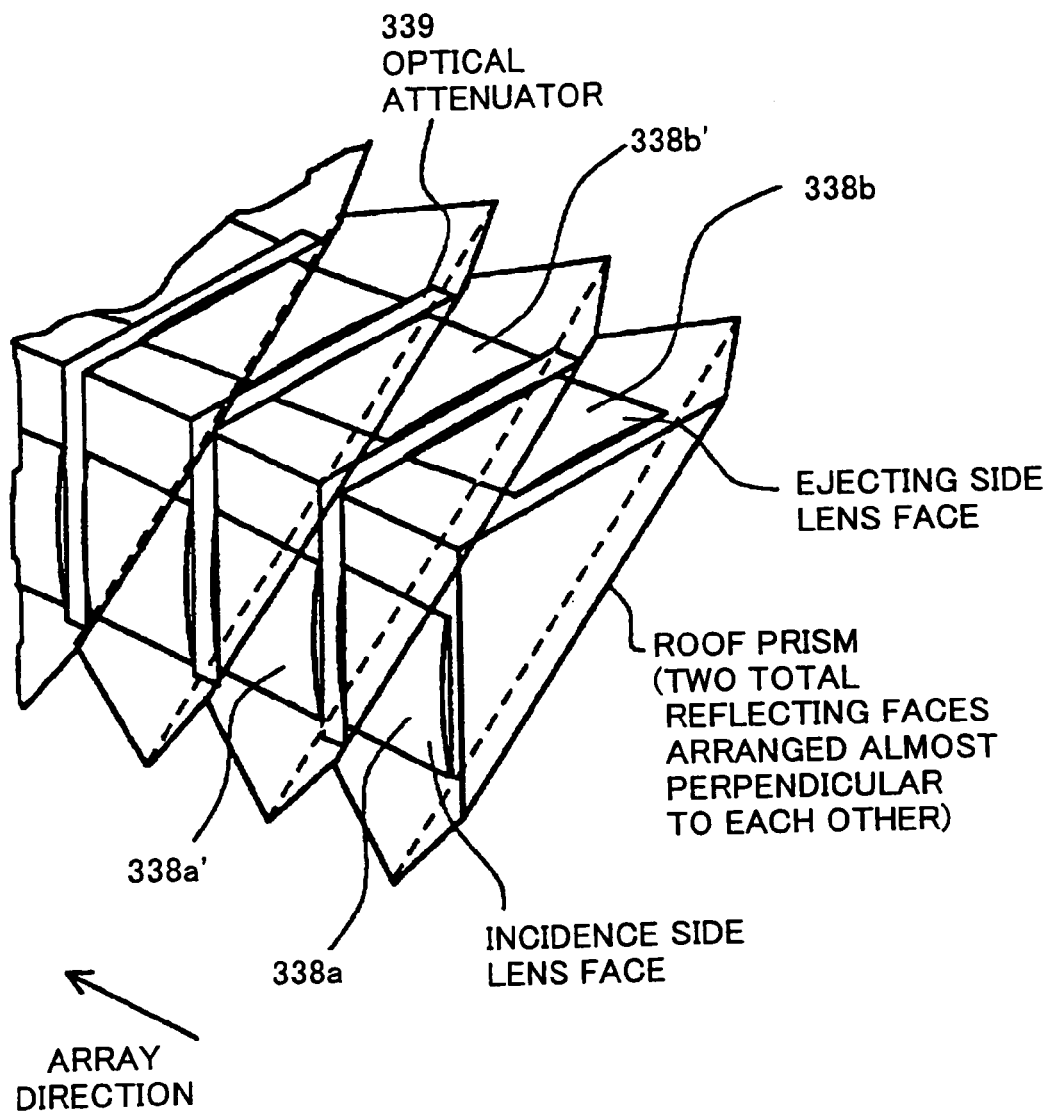
FIG. 41 is a schematic diagram showing the structure having an opaque component between lenses in the optical writing unit using the roof prism lens array.

In the example here, three ranks are considered. The three ranks are defined as Pa<PL, PL<=Pa<=PH, and PH<Pa. In the case of Pa<PL, the light volume of the light emitting devices on and near the edge of the light emitting device array chip is set up so that the gradients of the approximated lines of the exposure areas become as shown in FIG. 34. That is, the exposure areas of the light emitting devices on and near the edge of the light emitting device array chip are set smaller. In the case of PH<Pa, the light volume of the light emitting devices on and near the edge of the light emitting device array chip is set up so that the gradients of the approximated line of the exposure areas become as shown in FIG. 26. That is, the exposure areas of the light emitting devices on and near the edge of the light emitting device array chip are set greater In the case of PL<=Pa<=PH, it is not necessary to compensate for the light volume.

Generally, the exposure intensity distribution takes a monotonous distribution, such as the Gaussian distribution, or one that resembles the Gaussian distribution; and the cross-section (exposure area) at a certain threshold of the exposure intensity distribution becomes greater as the light volume becomes greater (not necessarily in a linear proportion). Namely, the exposure area is enlarged if the light volume is increased; and the exposure area is made smaller if the light volume is decreased. Care should be taken, however, that the peak and the bottom of the gradient of the approximated lines occur near the edges of the light emitting device array chips, and the peak and the bottom should always be confined within the predetermined acceptable range.

Further, the inventor of the present invention researched relations between the interval between the adjacent light emitting devices on the edges of the adjacent light emitting device array chips, and appearance of the vertical stripe (a black vertical line and white vertical line) on an image. According to experiments with the predetermined interval P being P=42.3 micrometers at 600 dpi, the results were that, if Pa<0.9P, a black stripe was recognized; and if Pa>1.1P, a white stripe was recognized. Therefore, PL and PH can be set up as PL=0.9P and PH=1.1P, respectively.

As previously described, it is desired that the evaluation width (the number) of the light emitting devices that are measured be in the range of about LK through 3LK. In reference to the junction part of the light emitting device array chips, the range is divided by the two adjacent light emitting device array chips, i.e., 0.5LK through 1.5LK each.

Figure 23:
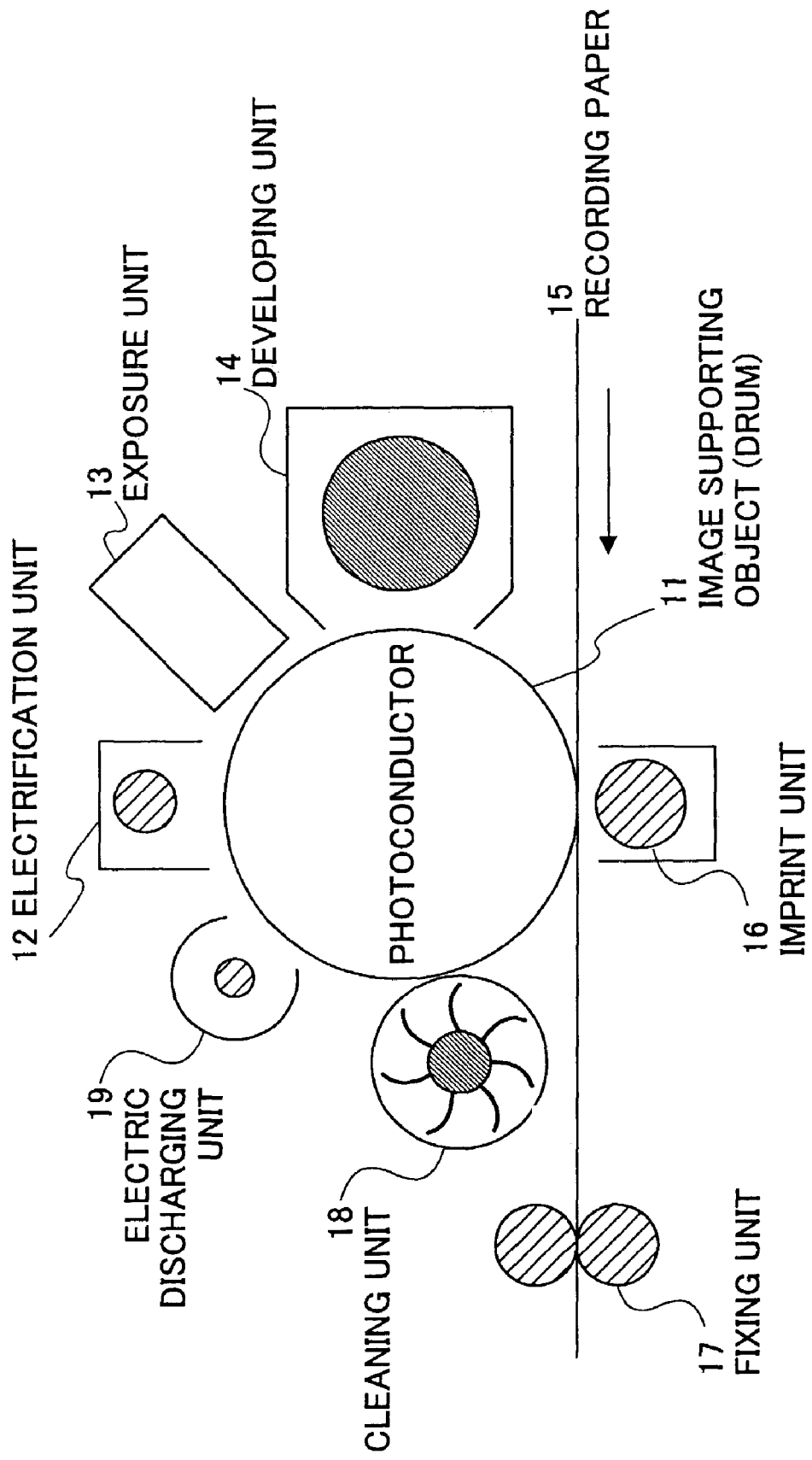
FIG. 23 shows an outline structure of the image forming apparatus according to the embodiment of the present invention.

Next, the image forming apparatus according to the embodiment of the present invention is shown by FIG. 23, wherein the above-described electrophotography process is carried out, among other things.

Further, the driving method of the optical writing unit according to the embodiment of the present invention includes a step for setting up a light volume of the light emitting devices such that the gradient of the approximated line of the exposure areas corresponding to light emitting devices that are selected in a predetermined cycle falls within a predetermined range in the entire effective image domain, a step for setting up the gradient of the approximated line of the exposure areas corresponding to light emitting devices on the edges of adjacent light emitting device array chips based on the interval (distance) between the adjacent light emitting devices on the edges of the adjacent light emitting device array chips, and a step for energizing each light emitting device according to the light volume set up in the manner described above.

By constituting the image forming apparatus in this manner, the driving method of the optical writing unit that drives each light emitting device for obtaining a high quality image is obtained.

The image forming apparatus of the embodiment of the present invention is equipped with the optical writing unit of the present invention. The above-described driving method of the present invention for the optical writing unit and the image forming apparatus is also applicable to an image forming apparatus called a tandem type image forming apparatus, which features a high-speed color image output.

According to the optical writing unit, the driving method thereof, and the image forming apparatus of the present invention, details of which are presented as above, the black stripe and the white stripe that are often conspicuous at the junction position of the light emitting device array chips can be suppressed, and a high quality image output is available.

Further, the present invention is not limited to these embodiments, but various variations and modifications may be made without departing from the scope of the present invention.

The present application is based on Japanese priority application No. 2002-206312 filed on Jul. 15, 2002, with the Japanese Patent Office, the entire contents of which are hereby incorporated by reference.

What is claimed is:

1. An optical writing unit, comprising:
a light emitting device array comprising a plurality of light emitting device array chips, each of the light emitting device array chips comprising a plurality of light emitting devices that are arranged at a predetermined interval P; and
an image forming device array comprising a plurality of image forming devices,
wherein light volume of the light emitting devices is set such that a calculated gradient of an approximated linear regression for exposure areas corresponding to a plurality of the light emitting devices that are selected at a predefined cycle falls within a predetermined range, the predetermined range being defined for an effective image area in its entirety, and
the light volume of the light emitting devices that are located closest and next closest to an edge of the light emitting device array chips are set up such that said gradient corresponds to an interval Pa between the light emitting device closest to the edge of one of the light emitting device array chips and the light emitting device closest to the edge of an adjacent one of the light emitting device array chips.

2. The optical writing unit as claimed in claim 1, wherein the predefined cycle is a constant throughout the light emitting device array.

3. The optical writing unit as claimed in claim 2, wherein one cycle of the predefined constant cycle comprises M+N of the light emitting devices, where M represents the number of the light emitting devices that are selected, N represents the number of the light emitting devices that are not selected, and M is equal to or less than N.

4. The optical writing unit as claimed in claim 1, wherein the predetermined interval P of the light emitting devices is set equal to $1/10$ or less than $1/10$ of an interval of the image forming devices.

5. The optical writing unit as claimed in claim 1, wherein the approximated linear regression of the exposure areas corresponding to the plurality of light emitting devices is obtained from a plurality of the light emitting devices that are located within a range between LK and 3LK, where LK represents an interval of the image forming devices.

6. The optical writing unit as claimed in claim 1, wherein intervals between the light emitting device closest to the edge of one of the light emitting device array chips and the light emitting device closest to the edge of an adjacent one of the light emitting device array chips are categorized into a plurality of ranks based on the magnitude of the intervals, and the light volume of each of the light emitting devices is set up according to said ranks.

7. The optical writing unit as claimed in claim 6, wherein the ranks are Pa<PL, PL<=Pa<=PH, and PH<Pa, where Pa represents the interval between the light emitting device closest to the edge of one of the light emitting device array chips and the light emitting device closest to the edge of an adjacent one of the light emitting device array chips, and PL and PH represent predetermined intervals establishing different threshold levels, where PL<PH.

8. The optical writing unit as claimed in claim 7, wherein the light volume is increased where Pa>PH, and the light volume is decreased where Pa<PL.

9. The optical writing unit as claimed in claim 7, wherein PL is set at 0.9P, and PH is set at 1.1P.

10. The optical writing unit as claimed in claim 1, wherein the light emitting devices that are located closest and next closest to an edge of the light emitting device array chip are the light emitting devices that correspond to a range of distances between 0.5LK and 1.5LK, where LK represents the interval of the image forming devices.

11. An image forming apparatus for forming an image, comprising:
an exposure unit comprising an image forming device array and a light emitting device array, the light emitting device array comprising a plurality of light emitting device array chips, each of the light emitting device array chips comprising a plurality of light emitting devices arranged at a predetermined interval,
wherein the light volume of each of the light emitting devices is set up such that a calculated gradient of an approximated linear regression of exposure areas corresponding to a plurality of the light emitting devices that are selected based on a predetermined cycle falls within a predetermined range for an effective image domain in its entirety, and the light volume of each of the light emitting devices closest and next closest to the edge of the light emitting device array chip is set up such that said gradient corresponds to an interval between the light emitting device closest to the edge of one of the light emitting device array chips and the light emitting device closest to the edge of an adjacent one of the light emitting device array chips.

12. A driving method for driving an optical writing unit comprising an exposure unit, the exposure unit comprising a light emitting device array, the light emitting device array comprising a plurality of light emitting device array chips, each of the light emitting device array chips comprising a plurality of light emitting devices arranged at a predetermined interval, the image forming device array comprising a plurality of image forming devices, the driving method comprising:

setting the light volume of each of the light emitting devices such that a calculated gradient of an approximated linear regression of exposure areas corresponding to a plurality of the light emitting devices that are selected based on a predetermined cycle falls within a predetermined range for an effective image domain in its entirety, and wherein the light volume of each of the light emitting devices closest and next closest to the edge of the light emitting device array chip is set up such that said gradient corresponds to an interval between the light emitting device closest to the edge of one of the light emitting device array chips and the light emitting device closest to the edge of an adjacent one of the light emitting device array chips.

* * * * *